United States Patent
Lee et al.

(10) Patent No.: US 9,262,867 B2
(45) Date of Patent: Feb. 16, 2016

(54) MOBILE TERMINAL AND METHOD OF OPERATION

(75) Inventors: Yoonwoo Lee, Seoul (KR); Yeongkyu Lim, Seoul (KR); Sunkyoo Hwang, Seoul (KR); Minyoung Eom, Seoul (KR); Sungmo Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 13/052,004

(22) Filed: Mar. 18, 2011

(65) Prior Publication Data

US 2011/0319130 A1 Dec. 29, 2011

(30) Foreign Application Priority Data

Jun. 28, 2010 (KR) ........................ 10-2010-0061335

(51) Int. Cl.
| | | |
|---|---|---|
| G06T 19/00 | (2011.01) | |
| G06T 19/20 | (2011.01) | |
| H04M 1/72 | (2006.01) | |
| G06F 3/048 | (2013.01) | |
| H04M 1/725 | (2006.01) | |

(52) U.S. Cl.
CPC ............... *G06T 19/20* (2013.01); *G06T 19/006* (2013.01); *H04M 1/72572* (2013.01); *H04M 1/72586* (2013.01)

(58) Field of Classification Search
USPC ......................................... 345/632, 633, 637
See application file for complete search history.

(56) References Cited

U.S. PATENT DOCUMENTS

| | | | | |
|---|---|---|---|---|
| 5,850,206 | A | * | 12/1998 | Kashiwagi .................... 345/418 |
| 2005/0251334 | A1 | * | 11/2005 | Mizuno ......................... 701/209 |
| 2007/0143345 | A1 | * | 6/2007 | Jones et al. ................. 707/104.1 |
| 2008/0072145 | A1 | | 3/2008 | Blanchard et al. |
| 2009/0102859 | A1 | * | 4/2009 | Athsani et al. ................ 345/619 |
| 2009/0158146 | A1 | * | 6/2009 | Curtis et al. .................. 715/700 |
| 2009/0167787 | A1 | * | 7/2009 | Bathiche et al. .............. 345/633 |

FOREIGN PATENT DOCUMENTS

| | | |
|---|---|---|
| EP | 1983731 | 10/2008 |
| WO | 01/80087 | 10/2001 |
| WO | 02/063514 | 8/2002 |
| WO | 2009/051485 | 4/2009 |

\* cited by examiner

*Primary Examiner* — Ulka Chauhan
*Assistant Examiner* — Schiller Hill
(74) *Attorney, Agent, or Firm* — Lee, Hong, Degerman, Kang & Waimey

(57) ABSTRACT

A method of operation of a mobile terminal includes displaying, on a display module, a preview image generated by a camera module, obtaining object information for at least one object shown in the preview image or at least one object within a predetermined distance of a current location of the mobile terminal, and displaying the object information on the display module using a display form that is determined according to a user preference level of the object information.

21 Claims, 19 Drawing Sheets

MOBILE TERMINAL AND METHOD OF OPERATION

CROSS-REFERENCE TO RELATED APPLICATIONS

This application claims benefit of earlier filing date and right to priority to Korean Application No. 10-2010-0061335, filed on Jun. 28, 2010, the contents of which are hereby incorporated by reference herein in their entirety.

BACKGROUND OF THE INVENTION

1. Field of the Invention

The present invention relates to mobile terminals.

2. Description of the Related Art

Mobile terminals are portable devices capable of performing various functions, such as voice/video calls, inputting and outputting information, and/or storing data. As the functions of mobile terminals diversify, an increasing number of mobile terminals have become able to provide various complicated functions, such as capturing photos and moving images, playing music files or moving image files, providing game programs, receiving broadcast programs, and providing wireless Internet services.

Most mobile terminals are equipped with camera modules for capturing photos or videos. As such, advanced mobile camera module technology including augmented reality (AR) is increasingly being implemented in mobile terminals. AR is a term that refers to the combination of a view of a physical real-world environment with additional information related to the physical real-world environment. Accordingly, AR can enable users to acquire information regarding their surroundings with an enhanced sense of reality.

However, AR techniques used in mobile terminals may not present the additional information related to the physical real-world environment in a clear and effective manner.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the present invention, a method of operation of a mobile terminal includes displaying, on a display module, a preview image generated by a camera module, obtaining object information for at least one object shown in the preview image or at least one object within a predetermined distance of a current location of the mobile terminal, and displaying the object information on the display module using a display form that is determined according to a user preference level of the object information.

It is contemplated that the method further includes setting the user preference level of the object information according to whether the object information was previously selected.

It is contemplated that the method further includes reducing the user preference level of the object information when the object information is no longer displayed on the display module in response to a first user command, and increasing the user preference level of the object information when information related to the object information is displayed on the display module in response to a second user command.

It is contemplated that displaying the object information includes reducing the user preference level of the object information when the object information is displayed using a first display size that is smaller than a default size in response to a first user command, and increasing the user preference level of the object information when the object information is displayed using a second display size that is larger than the default size in response to a second user command.

It is contemplated that the display form includes at least a color, a size, a brightness or a shape. It is further contemplated that readability of the display form is proportional to the user preference level of the object information.

It is contemplated that when the object information comprises a number of object information items, the method further includes displaying the number of object information items on the display module in an overlapping manner according to user preference levels of each of the plurality of object information items It is further contemplated that displaying the number of object information items on the display module in the overlapping manner comprises displaying object information items having a high user preference level over object information items having a low user preference level, such that the object information items having low user preference level are partially exposed under the object information items having high user preference level.

It is contemplated that when a user command for no longer displaying the object information is received, the method further includes no longer displaying the object information on the display module, reducing the user preference level of the object information, and storing the reduced user preference level of the object information.

It is contemplated that the method further includes displaying information related to the object information when a user command for displaying the information related to the object information is received, increasing the user preference level of the object information, and storing the increased user preference level of the object information.

In one aspect of the present invention, a method of operation of a mobile terminal includes displaying a preview image on a display module, wherein the preview image is generated by a camera module and includes a number of object information items, receiving a user command for selecting one of the number of object information items, setting a user preference level of the selected object information item in response to the user command, and storing the user preference level of the selected object information item.

It is contemplated that setting the user preference level of the selected object information item includes reducing the user preference level of the selected object information item when the user command is for no longer displaying the selected object information item.

It is contemplated that setting the user preference level of the selected object information item comprises increasing the user preference level of the selected object information item when the user command is for displaying information related to the selected object information item.

In one aspect of the present invention, a mobile terminal includes a camera module configured to capture images, a display module configured to display a preview image generated by the camera module, and a controller configured to display object information of at least one object shown in the preview image using a display form that is determined according to a user preference level of the object information.

It is contemplated that the controller is further configured to set the user preference level of the object information according to whether the object information was previously selected.

It is contemplated that the controller is further configured to reduce the user preference level of the object information when the object information is no longer displayed on the display module in response to a first user command, and increase the user preference level of the object information when information related to the object information is displayed on the display module in response to a second user command.

It is contemplated that the controller is further configured to reduce the user preference level of the object information when the object information is displayed using a first display size that is smaller than a default size in response to a first user command, and increase the user preference level of the object information when the object information is displayed using a second display size that is larger than the default size in response to a second user command.

It is contemplated that the display form includes at least a color, a size, a brightness or a shape.

It is contemplated that a readability of the display form is proportional to the user preference level of the object information.

It is contemplated that when the object information comprises a number of object information items, the controller is further configured to display the number of object information items on the display module in an overlapping manner according to a user preference levels of each of the number of object information items.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term "mobile terminal," as used herein, can include a mobile phone, a smart phone, a laptop computer, a digital broadcast receiver, a personal digital assistant (PDA), a portable multimedia player (PMP), or a navigation device. In this disclosure, the terms "module" and "unit" are used interchangeably.

Figure 1:
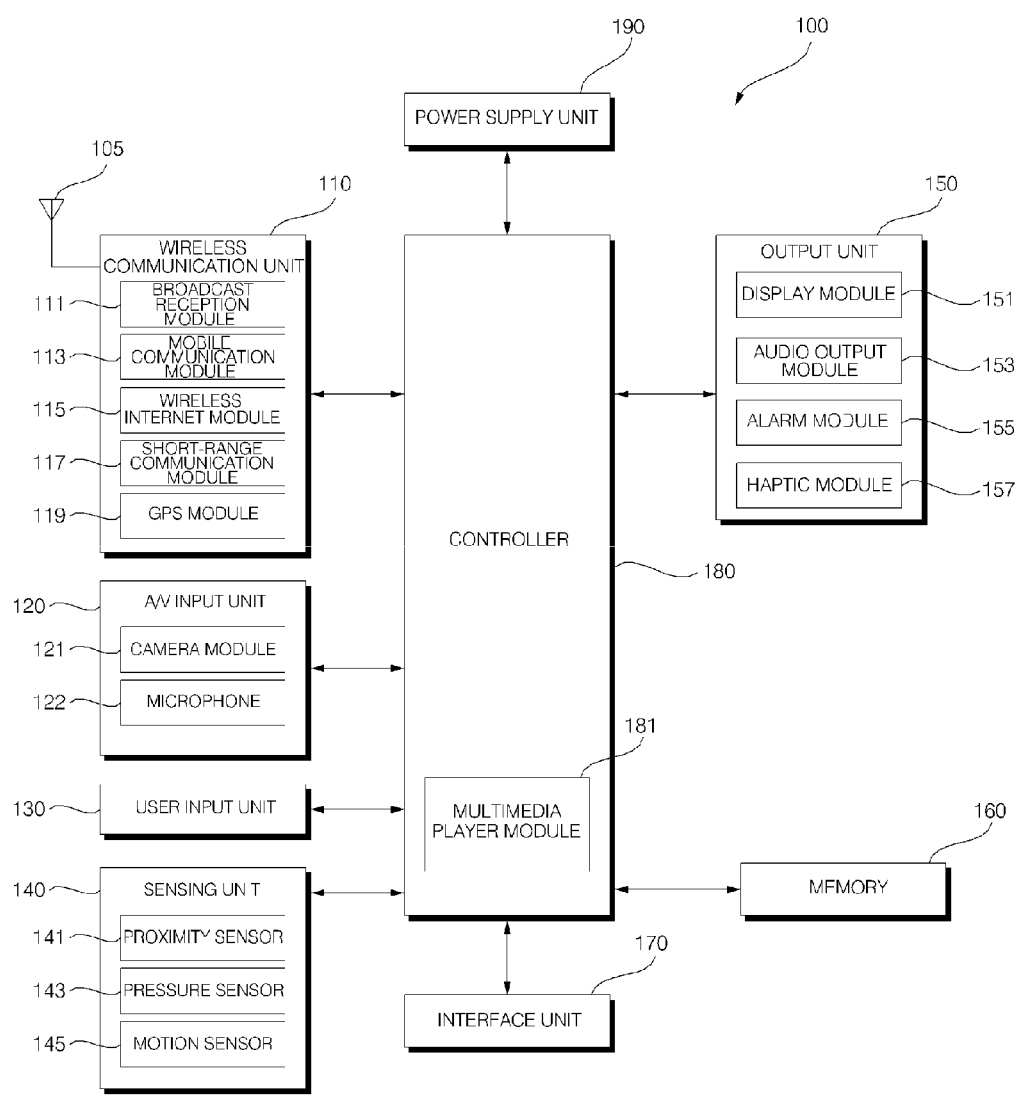
FIG. 1 illustrates a block diagram of a mobile terminal 100 in accordance with various embodiments of the invention.

FIG. 1 illustrates a block diagram of a mobile terminal 100 in accordance with various embodiments of the present invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1. It should also be understood that one or more of the components shown in FIG. 1 can be incorporated within a single component and, alternatively, one or more of the components shown in FIG. 1 can be configured using multiple components.

The wireless communication unit 110 may include a broadcast reception module 111, a mobile communication module 113, a wireless Internet module 115, a short-range communication module 117, and a global positioning system (GPS) module 119.

The broadcast reception module 111 receives broadcast signals and/or broadcast-related information from an external broadcast management server via a broadcast channel. The broadcast channel can be a satellite channel or a terrestrial channel. The broadcast management server can be a server that generates and transmits broadcast signals and/or broadcast-related information, or a server that receives a previously-generated broadcast signal and/or previously-generated broadcast-related information and transmits the previously-generated broadcast signal and/or previously-generated broadcast-related information to the mobile terminal 100.

For example, the broadcast signal can be a TV broadcast signal, a radio broadcast signal, a data broadcast signal, the combination of a data broadcast signal and a TV broadcast signal or the combination of a data broadcast signal and a radio broadcast signal.

The broadcast-related information can include broadcast channel information, broadcast program information and/or broadcast service provider information. The broadcast-related information can be provided to the mobile terminal 100 through a mobile communication network. In such a case, the broadcast-related information can be received by the mobile communication module 113, rather than by the broadcast reception module 111.

The broadcast reception module 111 can be used to receive broadcast signals of various types of broadcasting systems, such as digital broadcasting systems. The broadcast signal and/or the broadcast-related information received via the broadcast reception module 111 can be stored in a storage medium, such as the memory 160.

The mobile communication module 113 transmits and/or receives wireless signals to and/or from at least a base station, an external terminal, or a server through a mobile communication network. Such wireless signals can include various types of data according to whether the mobile terminal 100 transmits or receives voice call signals, video call signals, text messages, or multimedia messages.

The wireless Internet module 115 supports wireless Internet access for the mobile terminal 100. For example, the wireless internet module 115 can be embedded in the mobile terminal 100 or installed in an external device. The wireless Internet technology implemented by the wireless internet module 115 can be a wireless local area network (WLAN), Wireless Broadband (WiBro), World Interoperability for Microwave Access (WiMAX), or High Speed Downlink Packet Access (HSDPA).

The short-range communication module 117 is a module for supporting short-range communication. For example, the short-range communication module 117 can be configured to communicate using short range communication technology, such as Bluetooth™, radio frequency identification (RFID), Infrared Data Association (IrDA), Ultra-wideband (UWB), or ZigBee™.

The GPS module 119 can receive position information from a plurality of GPS satellites.

As shown in FIG. 1, the A/V input unit 120 can include an image capture device, such as a camera module 121, and a device for detecting sounds, such as microphone 122. For example, the camera module 121 can process image data of still pictures or video obtained via an image sensor of the camera module 121 in a video call or image capturing mode of the mobile terminal 100. The processed image frames can be displayed on a visual output device, such as the display module 151.

The A/V input unit 120 can be used to receive audio signals or video signals. The image frames processed by the camera module 121 can be stored in the memory 160, or transmitted via the wireless communication unit 110 to an external device. Other embodiments of the mobile terminal 100 can include more than one camera module 121.

The microphone 122 can receive external sound signals during a call mode, a recording mode, or a voice recognition mode, and can convert the sound signals into electrical sound data. For example, when the mobile terminal 100 is in the call mode, the mobile communication module 113 can convert the electrical sound data into data for transmission to a mobile communication base station and output the data obtained by the conversion. The microphone 122 can include various types of noise canceling or suppression algorithms for removing any undesirable noise in the received external sound signals.

The user input unit 130 can be a user input device configured to generate input data based on inputs entered by a user to control various operations of the mobile terminal 100. For example, the user input unit 130 can include a keypad, a dome switch and/or a touch pad, such as a static pressure or capacitive touch pad for receiving a command or information via contact by the user. As another example, the user input unit 130 can be implemented as a wheel, a jog dial, or a joystick capable of receiving a command or information via rotation by the user. As a further example, the user input unit 130 can be implemented as a finger mouse.

When the user input 130 is implemented as a touch pad and overlaid with the display module 151 in a layered manner, a "touch screen" may be formed allowing the display module 151 to function both as an input device and an output device.

The sensing unit 140 determines a current state of the mobile terminal 100, such as an opened or closed state, the location of the mobile terminal 100 and whether the mobile terminal 100 is placed in contact with a user. The mobile terminal 100 can generate a sensing signal based on the current state of the mobile terminal 100 for controlling the operation of the mobile terminal 100. For example, when the mobile terminal 100 is implemented as a slider-type mobile phone, the sensing unit 140 can be configured to determine whether the mobile terminal 100 is opened or closed. In addition, the sensing unit 140 can determine whether the power supply unit 190 supplies power and whether the interface unit 170 is connected to an external device.

The sensing unit 140 can include a proximity sensor 141, a pressure sensor 143 and a motion sensor 145. The proximity sensor 141 can determine the presence or absence of an object nearby and approaching the mobile terminal 100 without any physical contact with the object. More specifically, the proximity sensor 141 can determine the presence or absence of an object by detecting a change in an alternating current (AC) magnetic field, a static magnetic field or the rate of change of capacitance. The sensing unit 140 may include two or more proximity sensors 141.

The pressure sensor 143 can determine whether any pressure is being applied to the mobile terminal 100 or can measure the magnitude of any pressure being applied to the mobile terminal 100. The pressure sensor 143 can be installed at a location in the mobile terminal 100 where the detection of pressure is desired. For example, the pressure sensor 143 can be installed in the display module 151. In such a case, a typical touch input can be differentiated from a pressure touch input using data provided by the pressure sensor 143, since a pressure touch input is generally applied with a greater level of pressure than a typical touch input. In addition, when a pressure touch input on the display module 151 is detected, it is possible to determine the magnitude of pressure applied to the display module 151 upon the detection of a pressure touch input based on data provided by the pressure sensor 143.

The motion sensor 145 can determine the location and any motion of the mobile terminal 100 using an acceleration sensor or a gyro sensor.

An acceleration sensor is a device for detecting a variation in acceleration and converting the variation into an electrical signal. With recent developments in micro-electromechanical system (MEMS) technology, acceleration sensors have been widely used in various products for various purposes. For example, an acceleration sensor can be used as an input device in a computer game controller and configured to sense the motion of the human hand during play of a computer game. In one embodiment, several acceleration sensors can be installed in the mobile terminal 100 to represent various axial directions. Alternatively, only one acceleration sensor representing a Z axis may be installed in the mobile terminal 100. For example, when an acceleration sensor representing an X or Y axis is desired, instead of an acceleration sensor representing a Z axis, the acceleration sensor representing an X or Y axis can be mounted on an additional substrate, which can be mounted on a main substrate.

Gyro sensors are sensors for measuring angular velocity, and can determine the relative direction of rotation of the mobile terminal 100 with respect to a reference direction.

The output unit 150 can be configured to output audio signals, video signals and alarm signals. In one embodiment, the output unit 150 can include the display module 151, an audio output module 153, an alarm module 155, and a haptic module 157.

The display module 151 can display information processed by the mobile terminal 100. For example, when the mobile terminal 100 is in a call mode, the display module 151 can display a user interface (UI) or a graphic user interface (GUI) for making or receiving a call. For example, if the mobile terminal 100 is in a video call mode or an image capturing mode, the display module 151 can display a UI or a GUI for capturing or receiving images.

When the display module 151 and the user input unit 130 form a layered structure and are thus implemented as a touch screen, the display module 151 can be used as an output device, as well as an input device for receiving information via contact by the user. When the display module 151 is implemented as a touch screen, the display module 151 can also include a touch screen panel and a touch screen panel controller (not shown).

The touch screen panel, for example, can be a transparent panel attached to the exterior of the mobile terminal 100 and can be connected to an internal bus of the mobile terminal 100. The touch screen panel can detect whether the touch screen panel is being contacted by a user. Once a touch input to the touch screen panel is detected, the touch screen panel can transmit signals corresponding to the touch input to the touch screen panel controller. The touch screen panel controller can process the signals transmitted by the touch screen panel, and can transmit the processed signals to the controller 180. The controller 180 can determine whether a touch input has been generated and which part of the touch screen panel has been touched based on the processed signals transmitted by the touch screen panel controller.

In one embodiment, the display module 151 can include electronic paper (e-paper). E-paper is a type of reflective display technology that can achieve a high resolution, wide viewing angles and can maintain a displayed image even after power is no longer supplied. E-paper can be implemented on various types of substrates, such as plastic, metallic or paper. In addition, e-paper can reduce the power consumption of the mobile terminal 100, because it does not require a backlight assembly. The display module 151 may be implemented as e-paper by using electrostatic-charged hemispherical twist balls, electrophoretic deposition, or microcapsules.

The display module 151 can include at least a liquid crystal display (LCD), a thin film transistor (TFT)-LCD, an organic light-emitting diode (OLED), a flexible display, or a three-dimensional (3D) display. In one embodiment, the mobile terminal 100 can include two or more display modules 151. For example, the mobile terminal 100 can include an external display module (not shown) and an internal display module (not shown).

The audio output module 153 can output audio data received by the wireless communication unit 110 during a call reception mode, a call mode, a recording mode, a voice recognition mode, or a broadcast reception mode or can output audio data stored in the memory 160. In addition, the audio output module 153 can output various sound signals associated with the functions of the mobile terminal 100, such as receiving a call or a message. The audio output module 153 can include, for example, a speaker and a buzzer.

The alarm module 155 can output an alarm signal indicating the occurrence of an event in the mobile terminal 100, such as receiving a call signal, receiving a message, or receiving a key signal. The alarm signal can be, for example, an audio signal, a video signal, and/or a vibration signal. For example, the alarm module 155 can output an alarm signal upon receiving a call signal or a message. In addition, the alarm module 155 can receive a key signal and output an alarm signal as feedback to the key signal. Once an alarm signal is output by the alarm module 155, the user can be notified that an event has occurred. An alarm signal for notifying the user of the occurrence of an event can also be output by the display module 151 or the audio output module 153.

The haptic module 157 can provide various haptic effects (such as vibrations) that can be detected by the user. When the haptic module 157 generates vibrations, the intensity and the pattern of the vibrations can be altered. The haptic module 157 can synthesize different vibration effects and can output the result. Alternatively, the haptic module 157 can sequentially output different vibration effects.

The haptic module 157 can provide various haptic effects other than vibrations, such as a stimulation caused by an array of moving pins that are perpendicularly in contact with the skin of the user, a stimulation caused by the injecting or sucking of air through an injection hole or a suction hole, a stimulation involving an application of a stimulus to the surface of the user's skin, a stimulation caused by contact with an electrode, a stimulation caused by an electrostatic force, and a stimulation caused by the application of cold and warm temperatures using an element capable of absorbing or generating heat.

The haptic module 157 can enable a user to feel haptic effects via a kinesthetic sense of her fingers or arms. For example, the mobile terminal 100 can include at least two haptic modules 157.

The memory 160 can store various programs that are used for the operations performed by the controller 180. In addition, the memory 160 can store various data such as a list of contacts, messages, still images, or moving images.

For example, the memory 160 can include at least one type of storage medium, such as a flash memory, a hard disk, a multimedia card, a micro type memory, a card type memory, such as a secure digital (SD) card or extreme digital (XD) card, a random access memory (RAM), or a read-only memory (ROM). In other embodiments, the memory 160 can be a network storage device that can be accessed by the mobile terminal 100 via a network, such as the Internet.

The interface unit 170 can interface with an external device that can be connected to the mobile terminal 100. For example, the interface unit 170 can include at least a connector for a wired/wireless headset, a port for performing short-range communication, a power supply port for supplying power to the mobile terminal 100, an external battery charger, a wired/wireless data port, a card socket for a memory card, a subscriber identification module (SIM)/user identity module (UIM) card, an audio input/output (I/O) terminal, a video I/O terminal, or an earphone. The interface unit 170 can receive data from an external device or can be used to receive power from an external device. The interface unit 170 can transmit data provided by an external device to other components in the mobile terminal 100 or can transmit data provided by other components in the mobile terminal 100 to an external device.

When the mobile terminal 100 is connected to an external cradle (not shown in FIG. 1), power can be supplied from the external cradle to the mobile terminal 100 through the interface unit 170. In addition, various command signals can be transmitted from the external cradle to the mobile terminal 100 through the interface unit 170.

The controller 180 can control the general operations of the mobile terminal 100. For example, the controller 180 can perform various control operations related to making and receiving a voice call, transmitting and receiving data, or making and receiving a video call.

The controller 180 can include a multimedia player module 181 for reproducing or playing back multimedia data. In one embodiment, the multimedia player module 181 can be implemented as a hardware device and can be installed in the controller 180. In another embodiment, the multimedia player module 181 can be implemented as a software program.

The power supply unit 190 can be an external power source or an internal power source and can supply power to other components in the mobile terminal 100.

The mobile terminal 100 can include a wired/wireless communication system or a satellite-based communication system. The mobile terminal 100 can be configured to operate in a communication system transmitting data as frames or packets.

In one embodiment, the mobile terminal 100 can be a slider-type mobile phone. However, in other embodiments, the present invention can be applied to various other types of mobile phones, such as folder-types, bar-types, or swing-types.

Figure 2:
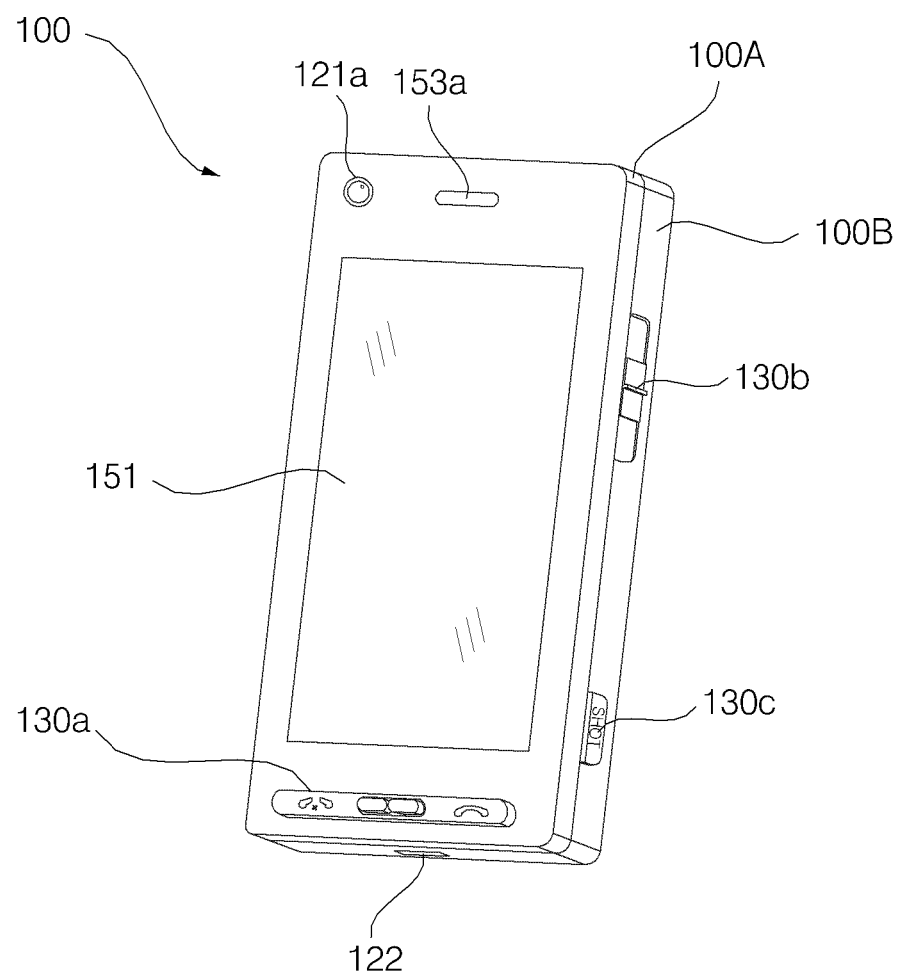
FIG. 2 illustrates a front perspective view of the mobile terminal 100 in accordance with various embodiments of the invention.

FIG. 2 illustrates a front perspective view of the mobile terminal 100 in accordance with various embodiments of the invention.

As shown in FIG. 2, the mobile terminal 100 includes a front case 100A and a rear case 100B. Various electronic components can be installed in the space (not shown in FIG. 2) between the front case 100A and the rear case 100B. At least one intermediate case (not shown in FIG. 2) can be additionally disposed between the front case 100A and the rear case 100B.

For example, the front case 100A, the rear case 100B and the at least one intermediate case discussed above can be formed by injection molding of a synthetic resin. Alternatively, the front case 100A and the rear case 100B can be formed of a metal, such as stainless steel (STS) or titanium (Ti).

As shown in FIG. 2, a display module 151, a first audio output module 153a, a first camera module 121a, and a first user input unit 130a are disposed on the front case 100A. As further shown in FIG. 2, a second user input unit 130b, a third user input unit 130c and the microphone 122 can be disposed at the sides of the rear case 100B.

The display module 151 can be, for example, an LCD or an OLED. The first audio output module 153a can be implemented as a speaker. The first camera module 121a can be configured for capturing still or moving images of the user.

In one embodiment, the display module 151 can be configured as a touch screen by incorporating the user input unit 130 in a layered manner. Therefore, a user can use the display module 151 to input information by touching the display module 151.

The user input unit 130a can allow a user to input such commands as "start," "end," and "scroll" to the mobile terminal 100. The second user input unit 130b can allow a user to select an operating mode for the mobile terminal 100. The third user input unit 130c can be used as a hot key for activating certain functions of the mobile terminal 100.

The microphone 122 can be configured to receive the user's voice or other sounds.

When a pointer, such as a user's finger or stylus, approaches the display module 151, the proximity sensor 141 located inside or near the display module 151 can detect the pointer and provide a proximity signal. For example, the proximity sensor 141 can be configured to output a proximity signal indicating the distance between the pointer and the display module 151. Such a distance is also referred to in the art as a "proximity depth."

The distance at which the proximity signal is provided by the proximity sensor 141 when the pointer approaches the display module 151 is referred to as a detection distance. For example, the proximity depth can be more precisely determined by using a number of proximity sensors installed in the mobile terminal 100, such as proximity sensor 141, having various detection distances and by comparing the proximity signals provided by each corresponding proximity sensor.

In addition, the part of the display module 151 being approached by the pointer and whether the pointer is being moved within the proximity of the display module 151 can be determined by identifying which of the number of proximity sensors 141 is providing a proximity signal. Then, the controller 180 can control the haptic module 157 to generate a haptic-effect signal corresponding to a touch key that is currently being approached by the pointer.

When the user tilts or shakes the mobile terminal 100, the motion sensor 145 can detect the movement of the mobile terminal 100 and generate a signal corresponding to the detected movement to the controller 180. The controller 180 can extract various motion information, such as the direction, angle, speed and intensity of the movement of the mobile terminal 100 and the location of the mobile terminal 100 from the signal provided by the motion sensor 145.

The controller 180 can keep track of the movement of the mobile terminal 100 based on the extracted motion information. The type of motion information that can be extracted from the signal provided by the motion sensor 145 can vary according to the type of motion sensor 145. It should be understood that the mobile terminal 100 can concurrently employ different types of the motion sensor 145. The controller 180 can control the motion sensor 145 to operate only upon the execution of a predetermined application.

Figure 3:
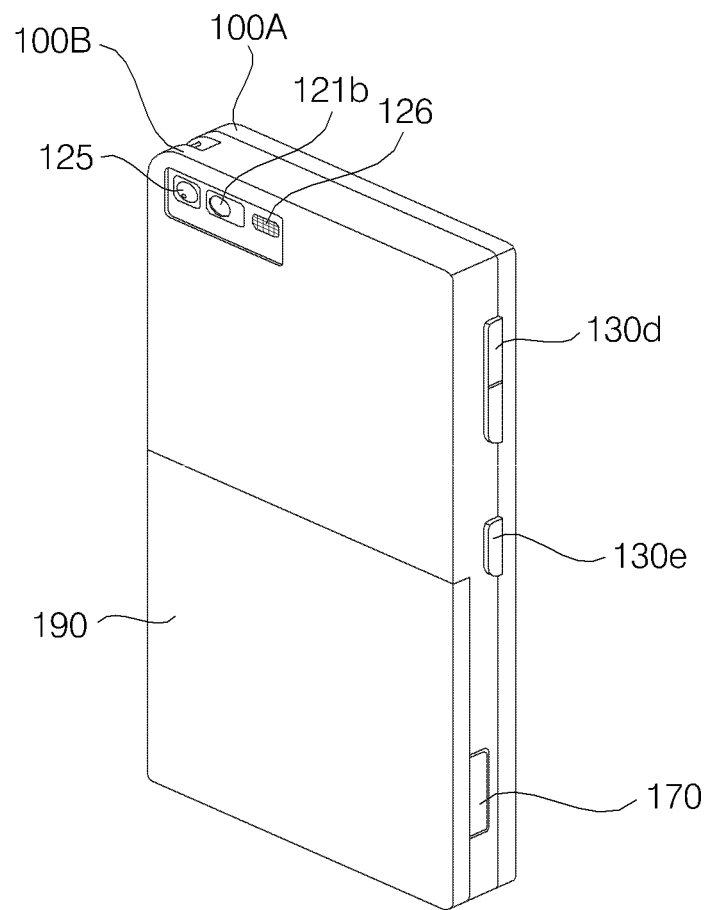
FIG. 3 illustrates a rear perspective view of the mobile terminal 100 in accordance with various embodiments of the invention.

FIG. 3 illustrates a rear perspective view of the mobile terminal 100 in accordance with various embodiments of the invention.

As shown in FIG. 3, fourth and fifth user input units 130d and 130e, and the interface unit 170 can be disposed on one side of the rear case 100B. As also shown in FIG. 3, the second camera 121b can be disposed on the back of the rear case 100B.

The first through fifth user input units 130a through 130e can be collectively referred to as "the user input unit 130." The user input unit 130 can be configured to utilize various manipulation methods which offer a tactile feedback to the user.

The second camera module 121b shown in FIG. 3 can have a direction of view that is different from the direction of view of the first camera module 121a shown in FIG. 2. In one embodiment, the first camera module 121a can be rotatably coupled to the front case 100A and can achieve the direction of view of the second camera module 121b. In such an embodiment, the second camera 121b can be optional.

The first and second camera modules 121a and 121b can be configured to have different resolutions. In one embodiment, the first camera module 121a can be configured to operate with a relatively lower resolution than the second camera module 121b. For example, the first camera module 121a can be used to capture an image of the user to allow immediate transmission of the image during a video call and the second camera module 121b can be used to capture images of general objects with high picture quality, which may not require immediate transmission in real-time, but may be stored for later viewing or use.

Additional camera related components, such as a mirror 125 and a camera flash 126 can be disposed near the second camera module 121b. The mirror 125 allows self-image capturing by allowing the user to see himself when the user desires to capture his own image using the camera module 121b. The camera flash 126 can illuminate a subject when the second camera module 121b captures an image of the subject.

A second audio output module (not shown in FIG. 3) can be additionally provided in the rear case 100B. The second audio output module can support a stereo function along with the first audio output module 153a. The second audio output module can also be used during a speaker-phone mode.

An antenna (not shown) for sending and receiving communication signals and/or an antenna for receiving broadcast signals can be disposed on one side of the rear case 100B. The antennas can be extended and retracted from the rear case 100B.

The power supply unit 190 can be disposed in the rear case 100B. The power supply unit 190 can be a rechargeable battery and can be detachably coupled to the rear case 100B.

Figure 4:
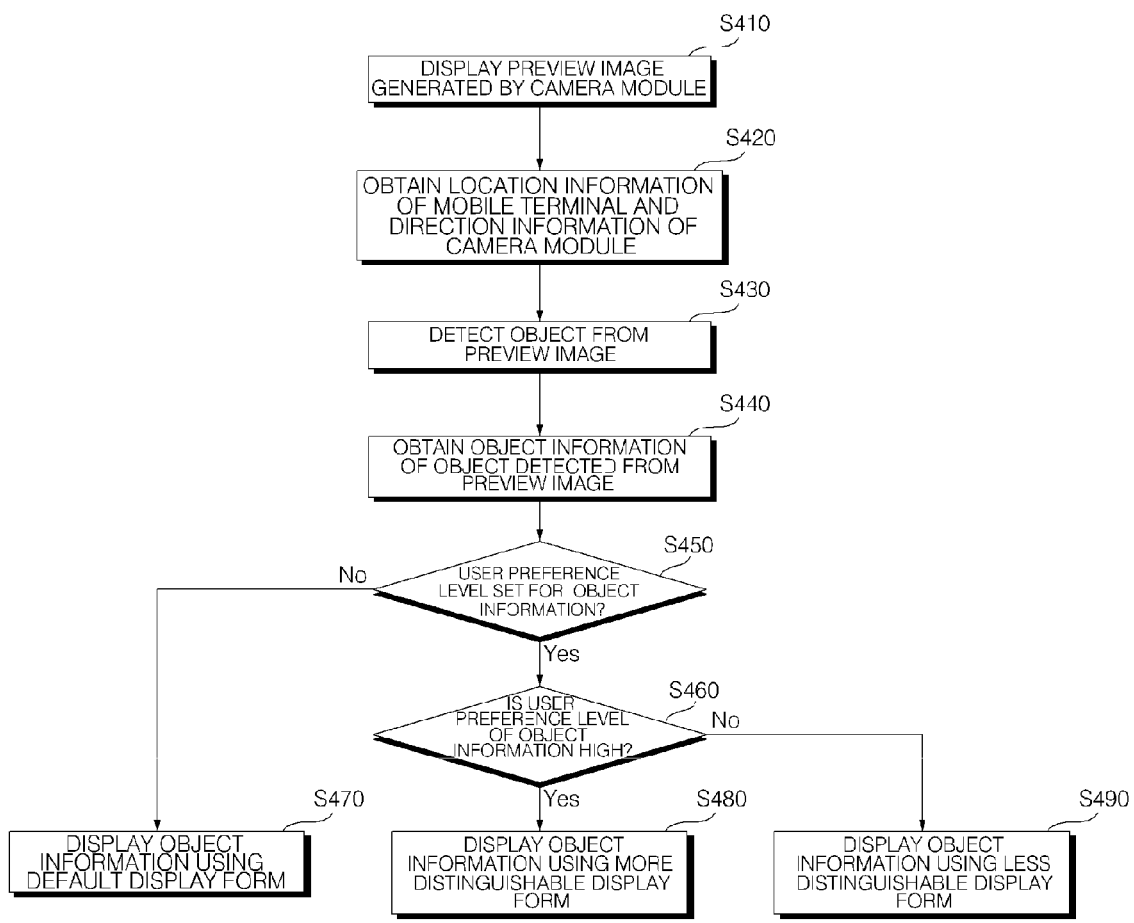
FIG. 4 is a flowchart illustrating a method for displaying object information in a mobile terminal according to a user preference in accordance with various embodiments of the present invention.

FIG. 4 is a flowchart illustrating a method for displaying object information in a mobile terminal according to a user preference in accordance with an exemplary embodiment of the present invention. Referring to FIG. 4, when the mobile terminal 100 is operating in augmented reality (AR) mode, a preview image generated by the camera module 121 can be displayed on the display module 151 (S410). For example, if a user places the mobile terminal 100 in the AR mode by referencing, for example, the manual of the mobile terminal 100, a preview image of the actual image to be captured by the camera module 121 can be displayed on the display module 151. The AR mode can be a mode provided by the mobile terminal 100 for associating a physical real-world image with real-world information.

The controller 180 can obtain location information of the mobile terminal 100 and direction information of the camera module 121 (S420). More specifically, the controller 180 can obtain the location information of the mobile terminal 100 via the GPS module 119, and the direction information of the camera module 121 via a direction sensor (not shown in FIG. 1) attached to the camera module 121. Since the camera module 121 is incorporated into the mobile terminal 100, the location information of the mobile terminal 100 can be considered the same as the location information of the camera module 121.

Although the location information of the mobile terminal 100 can be acquired in the form of GPS information provided by the GPS module 119, it should be understood that the location information of the mobile terminal 100 can be acquired by the controller 180 using various other methods, such as Assisted GPS (A-GPS). A-GPS is a system that involves the use of assistance data provided by a network to the mobile terminal 100, where the assistance data is acquired by the mobile terminal 100 via a Wireless Fidelity (Wi-Fi) positioning system (WPS), Bluetooth™, radio frequency identification (RFID) or a global navigation satellite system, such as Galileo or Global Orbiting Navigation Satellite System (GLONASS).

The location information of the mobile terminal 100 can be obtained using the GPS module 119 when the mobile terminal 100 is located in an outdoor environment. However, if the mobile terminal 100 is located in an indoor environment, the location information of the mobile terminal 100 can be obtained using the wireless Internet module 115 or the short-range communication module 117.

The controller 180 can obtain the direction information of the camera module 121 using various methods other than using the direction sensor attached to the camera module 121. For example, if the mobile terminal 100 is moving and the direction of the field of view of the camera module 121 is fixed, the controller 180 can determine the direction of the camera module 121 based on the displacement in the location of the mobile terminal 100.

In this exemplary embodiment, the controller 180 can obtain the location information of the mobile terminal 100 from the wireless communication unit 110 and the direction information of the camera module 121 from the direction sensor attached to the camera module 121. In another embodiment, however, the user can input initial location and direction information of the mobile terminal 100 into the mobile terminal 100 via the user input unit 130. The controller 180 can then determine the current location and direction of the mobile terminal 100 based on the initial location and direction information input by the user and information provided by the motion sensor 145.

The controller 180 can then perform a shape recognition operation on the preview image to detect at least one object from the preview image (S430). Although any type of object can be detected via the shape recognition operation, it is preferable to perform the shape recognition operation on objects that are equal to or greater than a predetermined size and that have object information, such as buildings. The object information can be, for example, information specifying at least the name, functions or origin of an object. For example, if an object on which the shape recognition operation is performed is a building, the object information can include the name of the building, various services provided in the building and/or information regarding the providers of the services.

The shape recognition operation includes a method of detecting the shape of an object in an image, where the object can be classified into a predefined model class, and providing geometric information of the detected shape of the object. Various shape recognition techniques, such as control point detection or shape rendering, can be used in the shape recognition operation for detecting an object without departing from the spirit and scope of the invention. It should be noted that in other embodiments, step S430 in FIG. 4 can be performed before step S420.

The controller 180 can obtain object information of the detected object in the preview image from an object information database stored in the memory 160 using, for example, the location and direction information of the camera module 121 and the results of shape recognition operation (S440). For example, the controller 180 can search the object information database stored in the memory 160 for information corresponding to one or more objects that match the location and direction information of the camera module 121 and the results of shape recognition operation. Alternatively, if the object information database is not stored in the memory 160, the controller 180 can access an object information database stored in an external device. For example, the object information database of the memory 160 or the object information database of the external device can store object information and location information for each of a number of objects.

The term "object information" as used herein can include, for example, one or more forms of information corresponding to an object, such as text information, link information, image information or audio information. For example, if the object is a building, the object information can include the name of the building and information specifying the facilities of the building, such as restaurants and theaters included in the building. As another example, if the object is a music album, the object information can include information identifying the names of retail stores selling the music album, the summary of the music album, and a preview of the music album. Object information can be displayed as at least an icon, text or an image.

In the present exemplary embodiment, object information can be obtained from the object information database stored in the memory 160 or in the external device using the location and direction information of the camera module 121 and the results of the shape recognition operation. For example, the object information can be obtained using at least one of the location and direction information of the camera module 121 and the results of the shape recognition operation. However, the object information can be determined with greater accuracy when the location and direction information of the camera module 121 and the results of the shape recognition operation are all used.

Referring to FIG. 4, the controller 180 can proceed to determine whether a user preference level has been set for the object information (S450). More specifically, the controller 180 can determine whether a user preference level has been set for the object information by determining whether the object information was previously displayed, determining whether a user command for selecting the object information has been received, determining whether the object information was previously no longer displayed in response to a user command, and/or determining whether information related to the object information was previously displayed.

If the controller 180 determines that a user preference level has not been set for the object information (S450), the controller 180 can display the object information using a default display form (S470). For example, the default display form can include the use of one or more display features, such as color, size, brightness and/or shape, for displaying the object information.

If the controller 180 determines that a user preference level has been set for the object information (S450), the controller can proceed to determine whether the user preference level set for the object information is high (S460). If the controller 180 determines that the user preference level is high (S460), the controller 180 can display the object information using a display form that is more distinguishable than the default display form (S480). However, if the controller 180 determines that the user preference level is not high (S460), the controller 180 can display the object information using a display form that is less distinguishable than the default display form (S490). For example, a display form can be configured to be more distinguishable or less distinguishable than the default display form by altering at least one of the display features, such as color, size, brightness and/or shape, used in the default display form.

In one embodiment, the controller 180 can display object information having no user preference level using a default size. The controller 180 can display object information having a high user preference level using a larger size than the default size, so that the object information having a high user preference level is effectively more distinguishable. Alternatively, the controller 180 can display object information having a low user preference level using a smaller size than the default size, so that the object information is effectively less distinguishable. Therefore, in the present exemplary embodiment, object information of interest can be immediately identified by a user by altering the manner in which the object information is displayed in accordance with the preference level of the user.

In one embodiment, the controller 180 can detect an object that is not shown in a preview image and which is located within a predetermined distance of the mobile terminal 100. In such a case, the controller 180 can obtain and display object information corresponding to the detected object in accordance with the preference level of the user.

Figure 5:
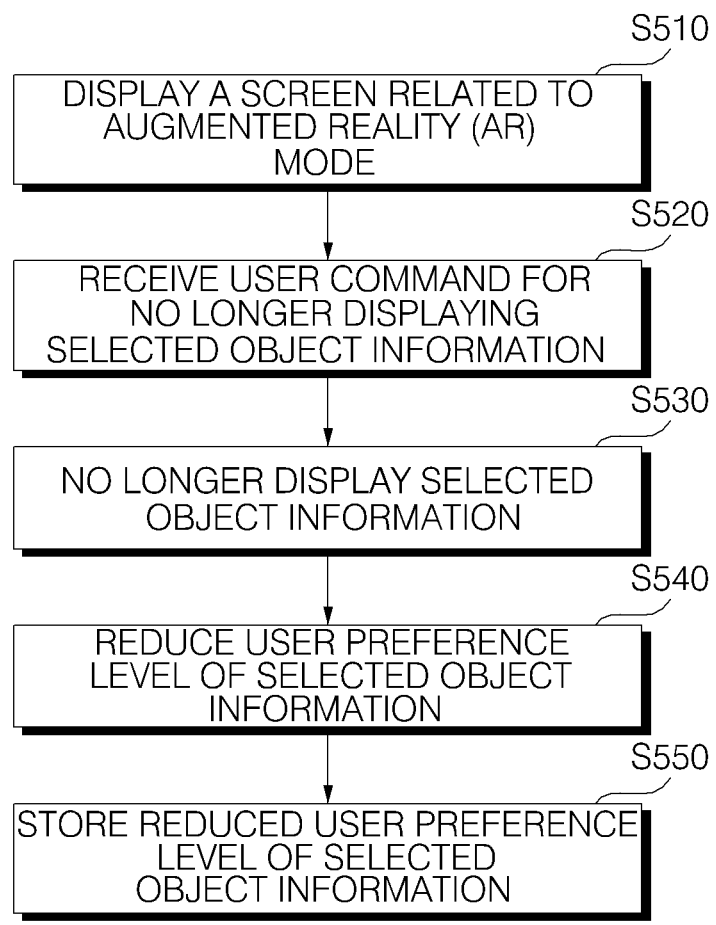
FIG. 5 is a flowchart illustrating a method for reducing and storing a user preference level of object information in a mobile terminal in response to a user command in accordance with various embodiments of the invention.

FIG. 5 is a flowchart illustrating a method for reducing and storing a user preference level of object information in a mobile terminal in response to a user command in accordance with various embodiments of the invention.

Referring to FIG. 5, when the mobile terminal 100 is operating in the AR mode, the controller 180 can display a screen related to the AR mode on the display module 151 (S510). For example, a preview image generated by the camera module 121 and object information corresponding to each object shown in the preview image can then be displayed on the screen.

The controller 180 can then receive a user command for no longer displaying object information selected by a user (S520). More specifically, when several object information items are displayed on the display module 151, the user may select one of the object information items and can input a command for no longer displaying the selected object information item.

Once the command for no longer displaying object information is received, the controller 180 can no longer display the selected object information (S530), and can reduce a user preference level of the selected object information (S540). For example, a preference database including user preference information for each of a number of object information items can be stored in the memory 160. If no user preference information for a selected object information item exists in the preference database, the controller 180 can set the selected object information item to a negative user preference level. On the other hand, if user preference information for the selected object information item exists in the preference database, the controller 180 can reduce the current user preference level of the selected object information item in the user preference information by a predetermined amount.

Thereafter, the controller 180 can store the reduced user preference level of the selected object information in the preference database (S550).

It should be understood that a user preference level of the selected object information can also be reduced in response to user commands other than the command for no longer displaying the object information, such as a user command for reducing the display size of the selected object information or a user command for indicating that the selected object information is no longer of interest to a user.

Figure 6:
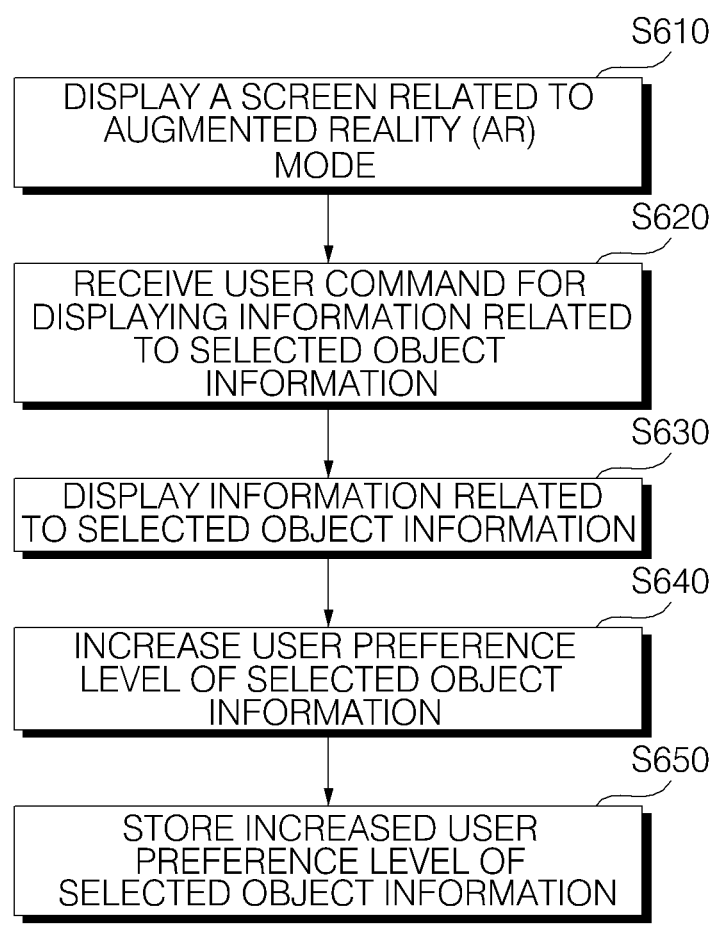
FIG. 6 is a flowchart illustrating a method for increasing and storing a user preference level of object information in a mobile terminal in response to a user command in accordance with various embodiments of the invention.

FIG. 6 is a flowchart illustrating a method for increasing and storing a user preference level of object information in a mobile terminal in response to a user command in accordance with various embodiments of the invention.

Referring to FIG. 6, when the mobile terminal 100 is operating in the AR mode, the controller 180 can display a screen related to the AR mode on the display module 151 (S610). For example, a preview image generated by the camera module 121 and object information corresponding to each object shown in the preview image can then be displayed on the screen.

The controller 180 can then receive a user command for displaying information related to the object information selected by a user (S620). More specifically, when several object information items are displayed on the display module 151, the user may select one of the object information items and can input a command to display information related to the selected object information item.

Thereafter, the controller 180 can search an object information database stored in the memory 160 for information related to the selected object information and display the related information (S630). For example, the information related to the selected object information can include detailed information on the selected object information and can further include information on objects of the same category as the object corresponding to the selected object information.

The controller 180 can then increase a user preference level of the selected object information (S640). For example, a preference database including user preference information for each of a number of object information items can be stored in the memory 160. If no user preference information for the selected object information exists in the preference database, the controller 180 can set the selected object information to a positive user preference level. On the other hand, if user preference information for the selected object information exists in the preference database, the controller 180 can increase the current user preference level corresponding to the selected object information in the user preference information by a predetermined amount.

Thereafter, the controller 180 can store the increased user preference level corresponding to the selected object information in the preference database (S650).

It should be understood that a user preference level corresponding to the selected object information can also be increased in response to user commands other than the command to display information related to the selected object information item, such as a user command for indicating that the selected object information item is of interest to a user.

FIGS. 7A through 7D illustrate exemplary screens of a mobile terminal for increasing a user preference level of selected object information in response to a variation in the display size of the object information in accordance with various embodiments of the invention.

Figure 7A:
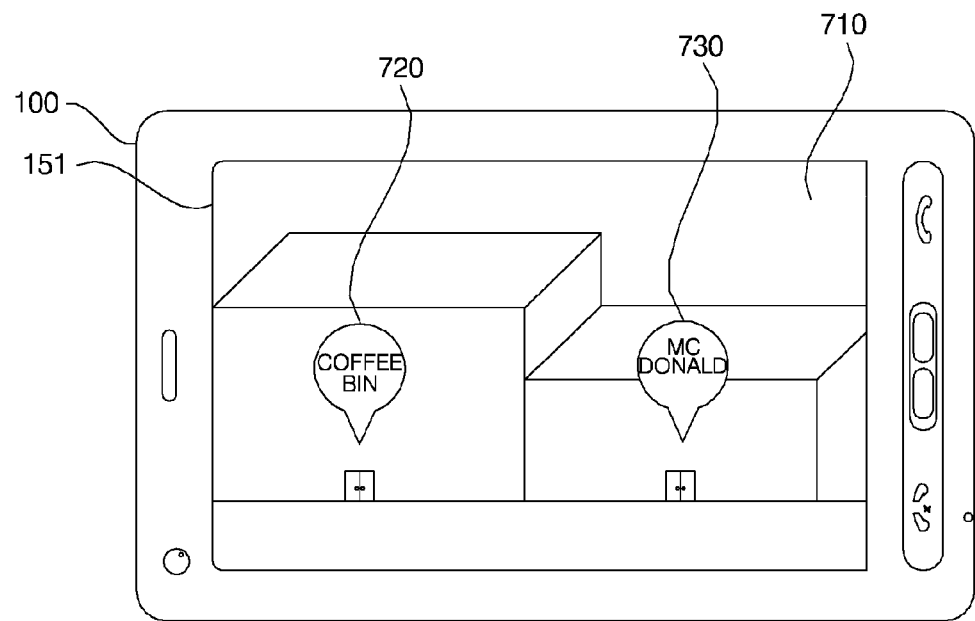
FIGS. 7A through 7D illustrate exemplary screens of a mobile terminal for increasing a user preference level of a selected object information item in response to a variation in the display size of the object information in accordance with various embodiments of the invention.

With reference to FIG. 7A, when the mobile terminal 100 is operating in the AR mode, the controller 180 can search for object information for each of the objects in the preview image 710 displayed on the display module 151. For example, the preview image 710 can be generated by the camera module 121. The controller 180 can display the object information determined from the search, such as the first object information 720 and second object information 730, on or in proximity to the corresponding objects in the preview image 710. As shown in FIG. 7A, the first object information 720 and the second object information 730 can assist a user to identify objects shown in the preview image 710.

Figure 7B:
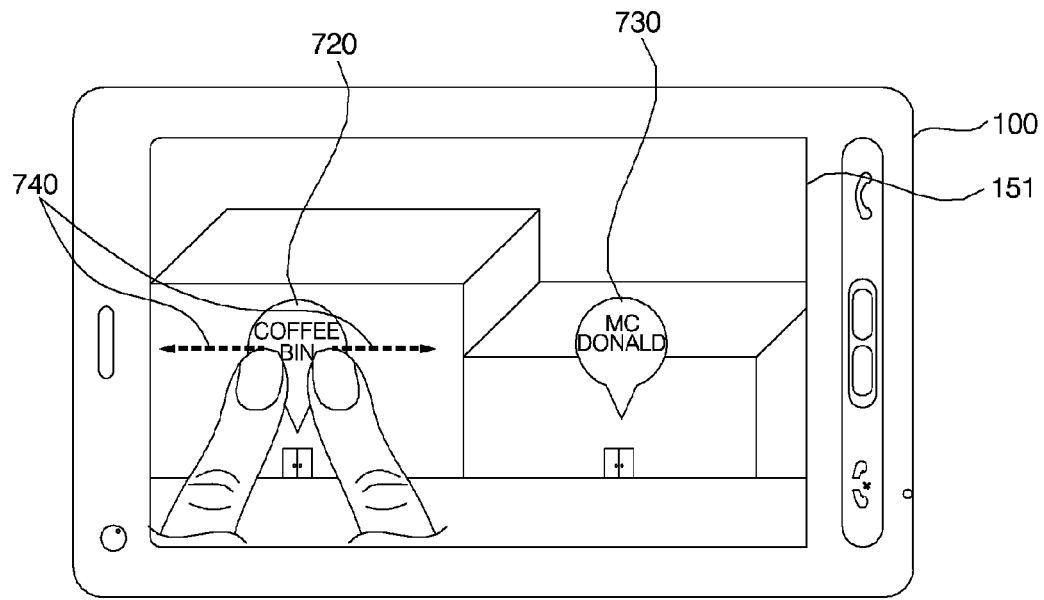

Referring to FIG. 7B, the user can enter a user command 740 for increasing the size of the first object information 720 by performing a multi-touch operation on the first object information 720. For example, the multi-touch operation can be performed by applying two or more touch pointers, such as the user's fingers, on the first object information 720 and then dragging the touch pointers apart from each other as shown in FIG. 7B.

Figure 7C:
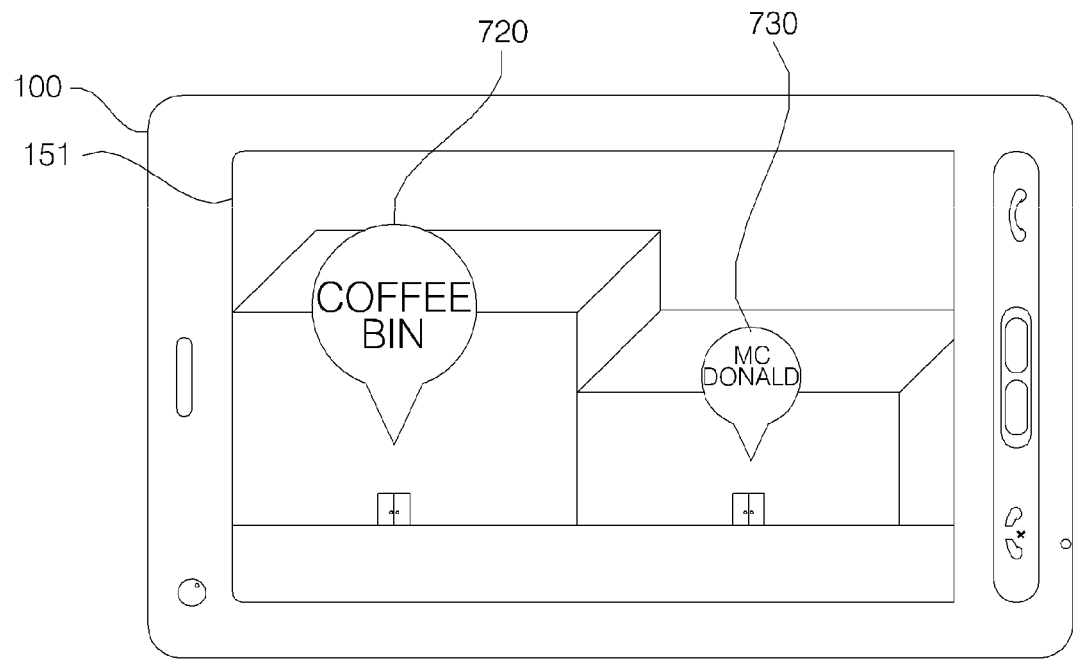

Referring to FIG. 7C, upon receiving the user command 740, the controller 180 can increase the display size of the first object information 720 by an amount corresponding to the distance that the touch pointers were dragged apart to provide a larger size first object information 720 shown in FIG. 7C. The controller 180 can increase a user preference level of the first object information 720 in response to the user command 740, and store the increased user preference level of the first object information 720 in the preference database in the memory 160.

Figure 7D:
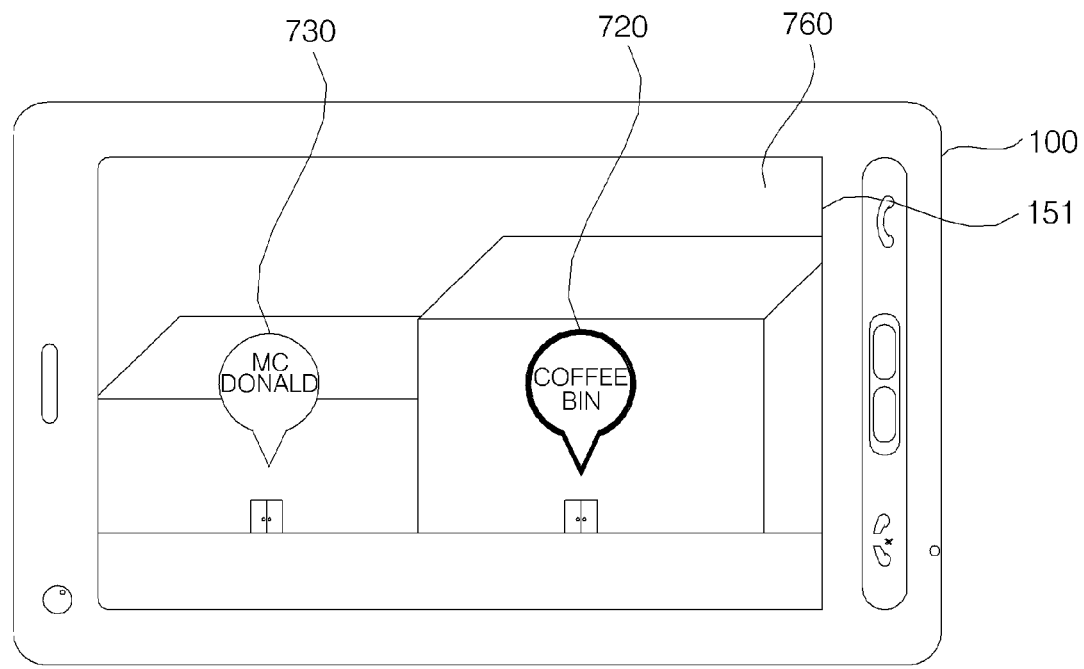

As shown in FIG. 7D, when the user moves with the mobile terminal 100 and changes the view of the camera module 121, the preview image 710 displayed on the display module 151 is changed to the preview image 760 according to the current view of the camera module 121. The controller 180 can search for object information of each object shown in the preview image 760 according to a current location of the mobile terminal 100.

The controller 180 can display the results of the search using different display forms according to user preference levels. More specifically, the controller 180 can search the preference database stored in the memory 160 for user preference information corresponding to the object information determined by the search, such as the first object information 720 and the second object information 730. If no user preference information for the object information exists in the preference database, the controller 180 can display the object information using a default display form. On the other hand, if user preference information for the object information does exist, the controller 180 can display the object information using a display form that is more distinguishable than the default display form.

For example, the controller 180 can search the preference database stored in the memory 160 for user preference information corresponding to the first object information 720 and the second object information 730. Since the first object information 720 has an increased user preference level and since no user preference information exists for the second object information 730, the controller 180 can display the first object information 720 using a display form that is more distinguishable than the default display form used for displaying the second object information 730. For example, the first object information 720 can be displayed as the distinguishable first object information 720 enclosed in a double line and the second object information 730 can be displayed using a default display form as shown in FIG. 7D.

FIGS. 8A through 8D illustrate exemplary screens of a mobile terminal for decreasing a user preference level of a selected object information item in response to a variation in the display size of the object information in accordance with various embodiments of the invention.

Figure 8A:
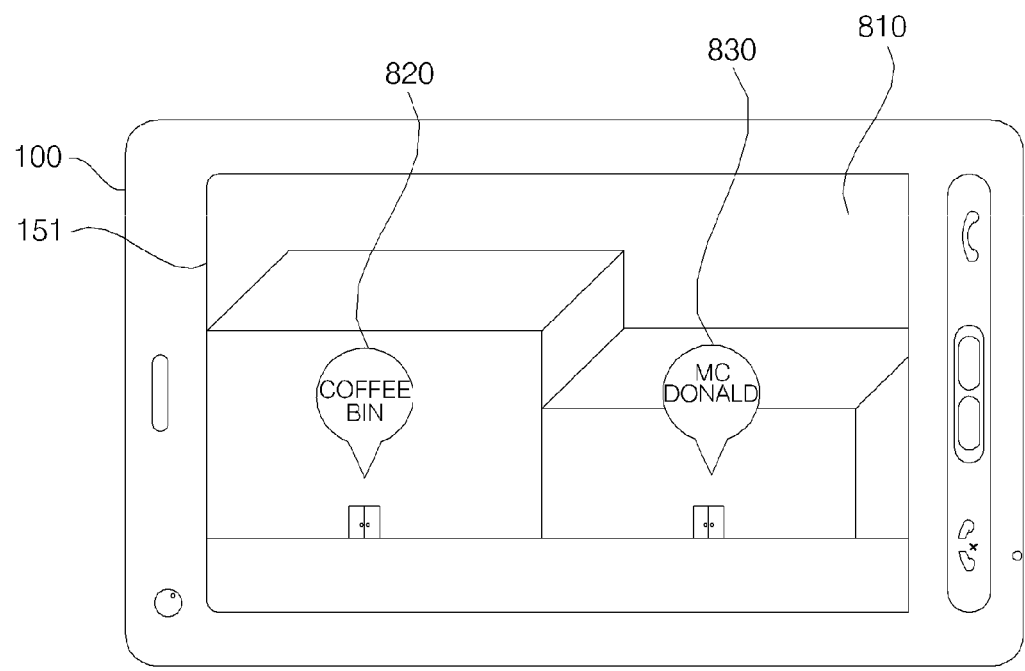
FIGS. 8A through 8D illustrate exemplary screens of a mobile terminal for decreasing a user preference level of a selected object information item in response to a variation in the display size of the object information in accordance with various embodiments of the invention.

With reference to FIG. 8A, when the mobile terminal 100 is operating in the AR mode, the controller 180 can search for object information for each of the objects in the preview image 810 displayed on the display module 151. For example, the preview image 810 can be generated by the camera module 121. The controller 180 can display the object information determined from the search, such as the first object information 820 and the second object information 830, on or in proximity to the corresponding objects in the preview image 810. As shown in FIG. 8A, the first object information 820 and the second object information 830 can assist a user to identify objects shown in the preview image 810.

Figure 8B:
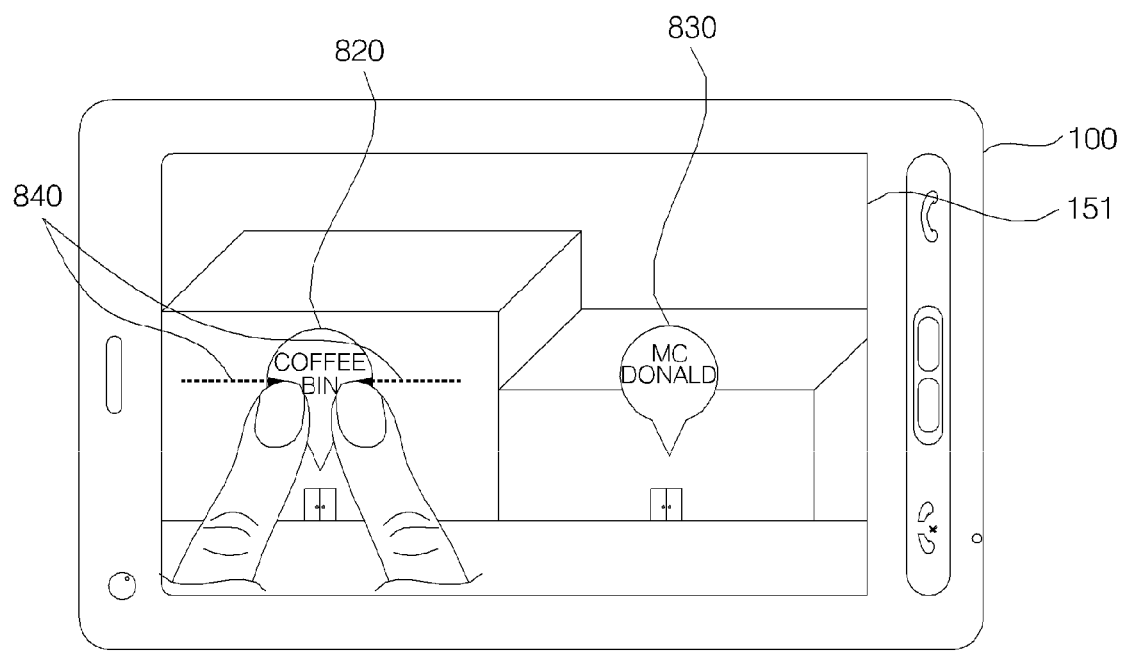

Referring to FIG. 8B, the user may enter a user command 840 for reducing the size of the first object information 820 by performing a multi-touch operation on the first object information 820. For example, the multi-touch operation can be performed by applying two or more touch pointers, such as the user's fingers, on the first object information 820 and then dragging the touch pointers toward each other as shown in FIG. 8B.

Figure 8C:
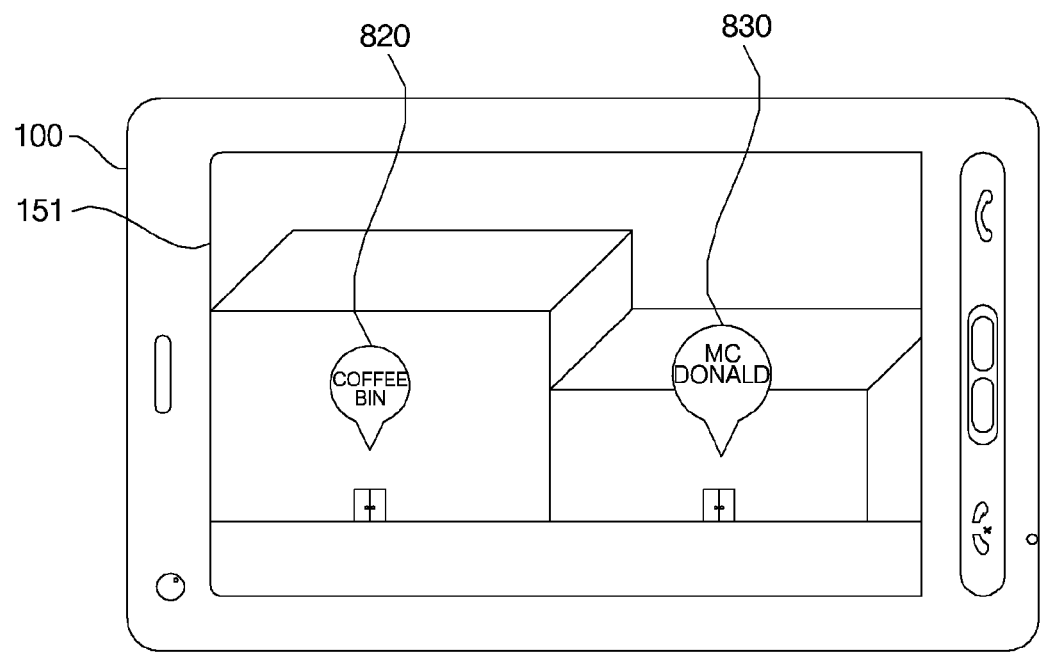

Referring to FIG. 8C, upon receiving the user command 840, the controller 180 can reduce the display size of the first object information 820 by an amount corresponding to the distance that the touch pointers were dragged toward each other to provide a smaller size first object information 820 shown in FIG. 8C. The controller 180 can decrease a user preference level of the first object information 820 in response to the user command 840, and store the decreased user preference level of the first object information 820 in the preference database in the memory 160.

Figure 8D:
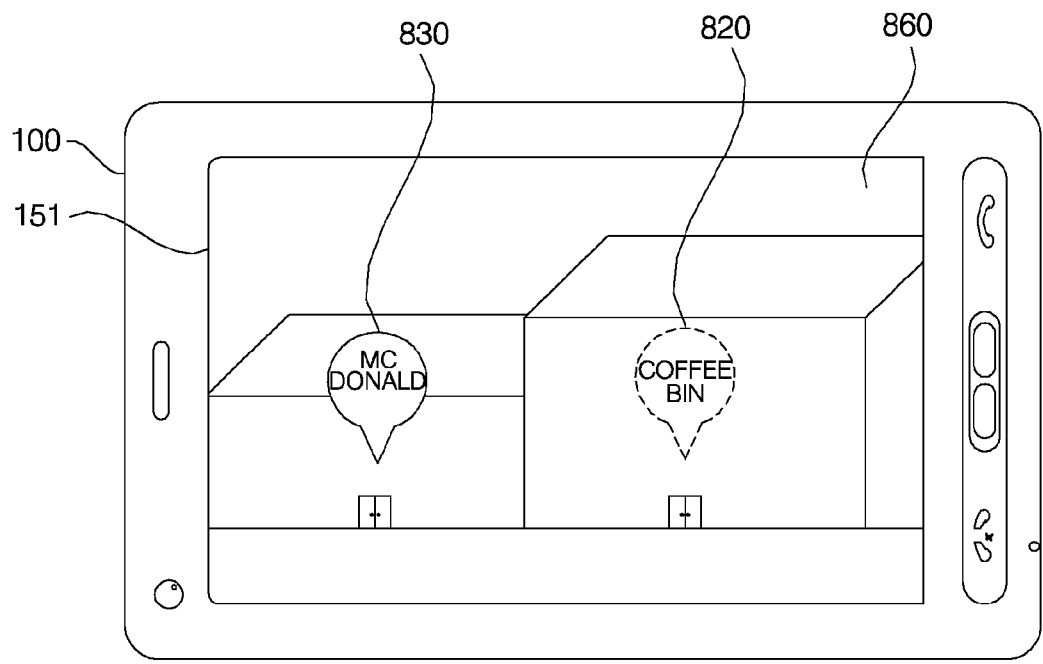

As shown in FIG. 8D, when the user moves with the mobile terminal 100 and changes the view of the camera module 121, the preview image 810 displayed on the display module 151 is changed to the preview image 860 according to the current view of the camera module 121. The controller 180 can search for object information of each object shown in the preview image 860 according to a current location of the mobile terminal 100.

The controller 180 can display the object information determined from the search using different display forms according to user preference levels. More specifically, the controller 180 can search the preference database stored in the memory 160 for user preference information corresponding to the object information determined by the search, such as the first object information 820 and the second object information 830. If no user preference information for the object information exists in the preference database, the controller 180 can display the object information in a default display form. On the other hand, if user preference information for the object information does exist, the controller 180 can display the object information using a display form in accordance with the user's preference level.

For example, the controller 180 can search the preference database stored in the memory 160 for user preference information corresponding to the first object information 820 and the second object information 830. Since the first object information 820 has a decreased user preference level and since no user preference information exists for the second object information 830, the controller 180 can display the first object information 820 using a display form that is less distinguishable than the default display form used for displaying the second object information 830. For example, the first object information 820 can be displayed as the less distinguished first object information 820 enclosed in a broken line and the second object information 830 can be displayed using a default display form as shown in FIG. 8D.

Alternatively, the user preference level for object information can be changed by varying the display size of object information displayed in a preview image by zooming in or out of the preview image. For example, the user may zoom in the preview image to increase the display size of object information displayed in the preview image, or zoom out of the preview image to reduce the display size of object information displayed in the preview image. The user preference level of the object information can then be varied accordingly by the controller 180 as previously discussed with respect to FIGS. 7A through 7D and FIGS. 8A through 8D.

Figure 9A:
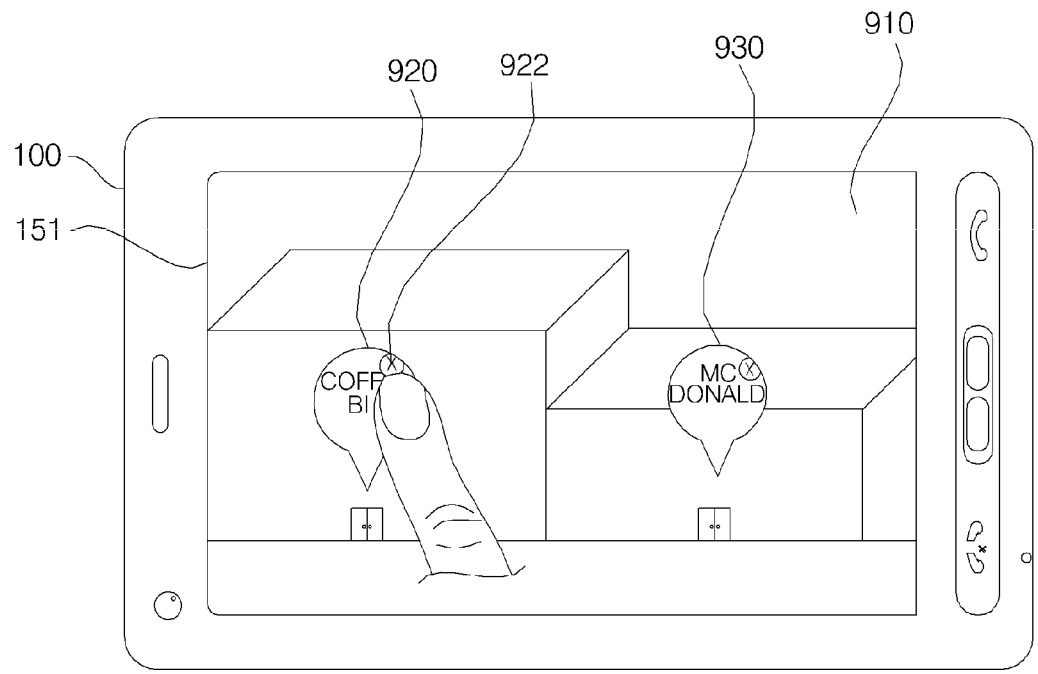
FIGS. 9A through 9C illustrate exemplary screens of a mobile terminal for decreasing a user preference level of object information in response to a command for no longer displaying the object information in accordance with various embodiments of the invention.
Figure 9B:
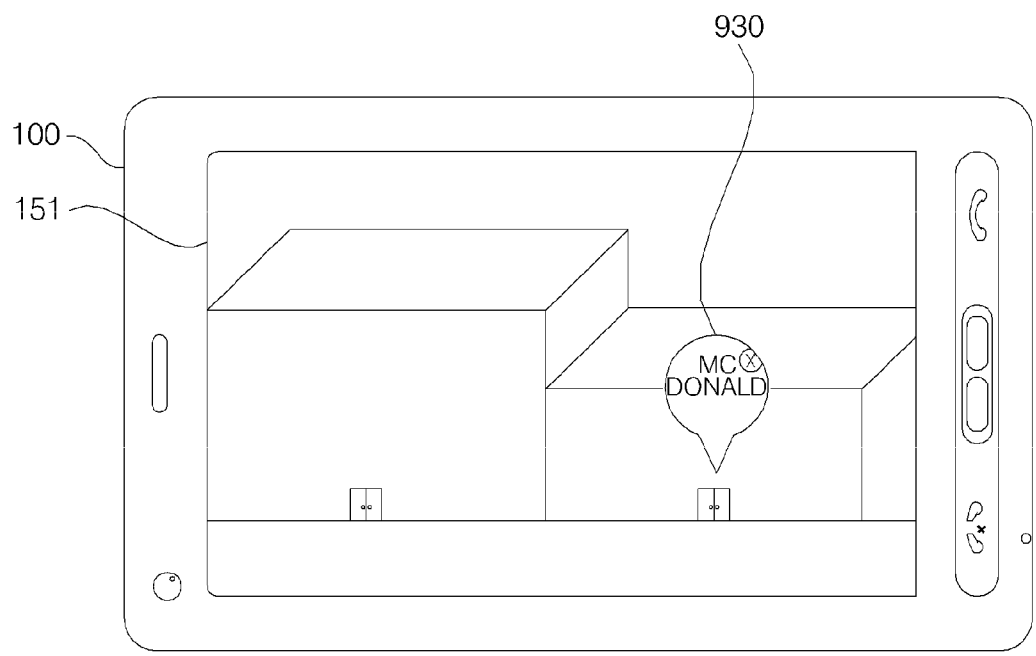
Figure 9C:
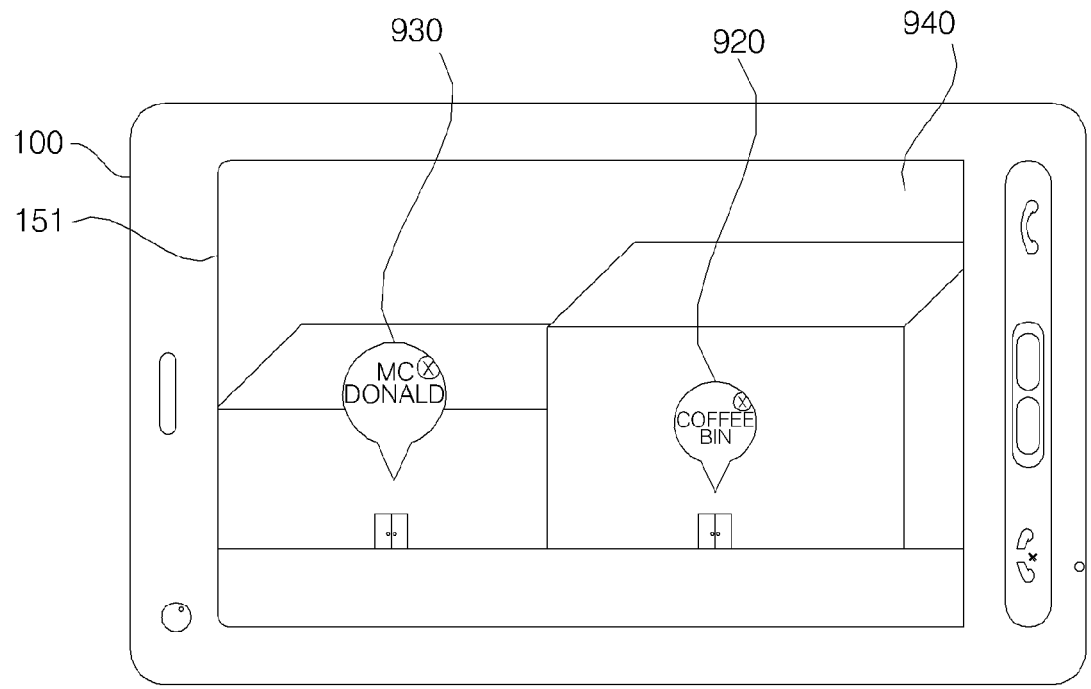

FIGS. 9A through 9C illustrate exemplary screens of a mobile terminal for decreasing a user preference level of object information in response to a command for no longer displaying object information in accordance with various embodiments of the invention.

With reference to FIG. 9A, when the mobile terminal 100 is operating in the AR mode, the controller 180 can display a preview image 910 on the display module 151. For example, the preview image 910 can be an image generated by the camera module 121. The controller 180 can display object information corresponding to each object within a predetermined distance of the mobile terminal 100, such as the first object information 920 and the second object information 930, on or in proximity to the corresponding objects in the preview image 910.

As shown in FIG. 9A, the user may enter a user command 922 for no longer displaying the first object information 920, for example, by touching icon 922 in the first object information 920. Referring now to FIG. 9B, upon receiving the user command 922, the controller 180 can no longer display the first object information 920 on the preview image 910. The controller 180 can then decrease a user preference level of the first object information 920 in response to the user command 922, and store the decreased user preference level of the first object information 920 in the preference database in the memory 160.

As shown in FIG. 9C, when the user moves with the mobile terminal 100 and changes the view of the camera module 121, the preview image 910 displayed on the display module 151 is changed to the preview image 940 according to the current view of the camera module 121. The controller 180 can search for object information of each object within a predetermined distance of the mobile terminal 100 and display the object information determined by search on or in proximity to the corresponding objects in the preview image 940.

The controller 180 can display the object information determined from the search using different display forms according to user preference levels. More specifically, the controller 180 can search the preference database stored in the memory 160 for user preference information corresponding to the object information determined by the search, such as the first object information 920 and the second object information 930. If no user preference information for the object information exists in the preference database, the controller 180 can display the object information in a default display form. On the other hand, if user preference information for the object information does exist, the controller 180 can display the object information using a display form in accordance with the user's preference level.

For example, the controller 180 can search the preference database stored in the memory 160 for user preference information corresponding to the first object information 920 and the second object information 930. Since the first object information 920 has a decreased user preference level and since no user preference information exists for the second object information 930, the controller 180 can display the first object information 920 using a display form that is less distinguishable than the default display form used for displaying the second object information 930. For example, the first object information 920 can be displayed as the smaller sized first object information 920, and the second object information 930 can be displayed using a default display form as shown in FIG. 9C.

FIGS. 10A through 10D illustrate exemplary screens of a mobile terminal for increasing a user preference level of object information in response to a command for displaying information related to the object information in accordance with various embodiments of the invention.

Figure 10A:
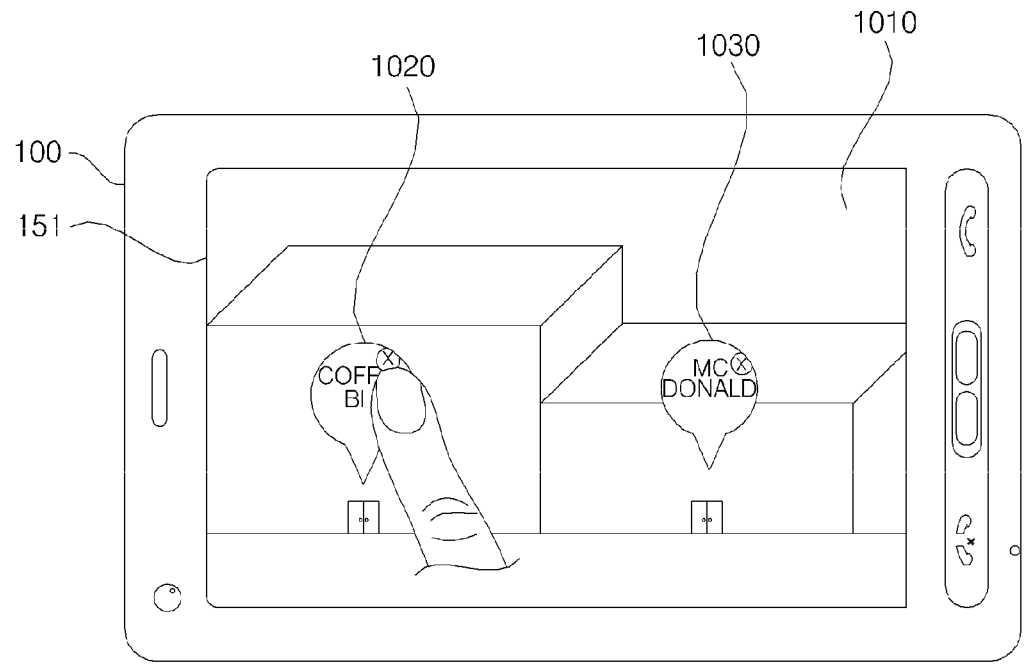
FIGS. 10A through 10D illustrate exemplary screens of a mobile terminal for increasing a user preference level of object information in response to a command for displaying information related to the object information in accordance with various embodiments of the invention.

With reference to FIG. 10A, when the mobile terminal 100 is operating in the AR mode, the controller 180 can display a preview image 1010 on the display module 151. For example, the preview image 1010 can be an image generated by the camera module 121. The controller 180 can display object information corresponding to each object within a predetermined distance of the mobile terminal 100, such as the first object information 1020 and the second object information 1030, on or in proximity to the corresponding objects in the preview image 1010.

Figure 10B:
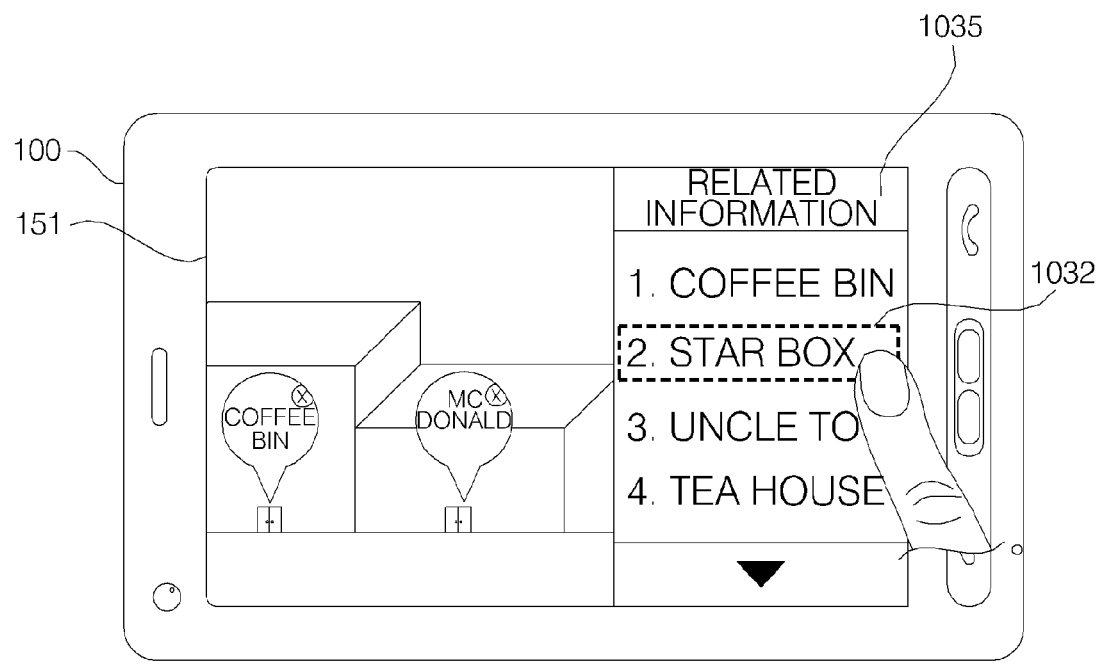

As shown in FIG. 10A, the user may enter a user command for displaying information related to the first object information 1020, for example, by touching the first object information 1020. Referring now to FIG. 10B, upon receiving the user command, the controller 180 can obtain information related to the first object information 1020, such as the related information 1035, from the object information database stored in the memory 160. The controller 180 can display the related information 1035 on the preview image 1010 as shown in FIG. 10B.

The related information 1035 can include, for example, detailed information regarding the first object information 1020 and information regarding the category of business of the object corresponding to the first object information 1020. As shown in FIG. 10B, for example, the related information 1035 including a list of objects classified in the same category of business as the object corresponding to the first object information 1030 can be displayed on the preview image 1010.

A user can select one of the objects listed in the related information 1035, such as object 1032, by touching the object listed in the related information 1035 as shown in FIG. 10B. The controller 180 can then increase a user preference level of the object 1032 in response to the selection of the object 1032, and store the increased user preference level of the object 1032 in the preference database in the memory 160.

Figure 10C:
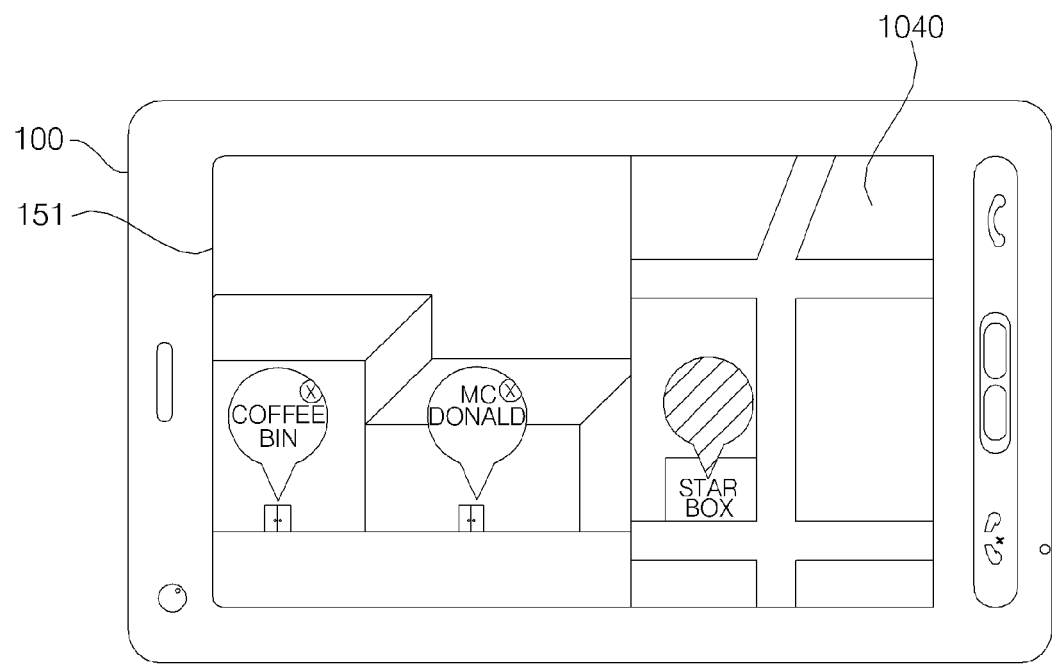

With reference to FIG. 10C, for example, the controller 180 can then display information 1040 related to the object 1032, such as a map indicating the location of the object 1032. The user can identify the location of the object 1032 using the map and can move with the mobile terminal 100 to the location of the object 1032. The user can then place the object 1032 in the field of view of the camera module 121.

Figure 10D:
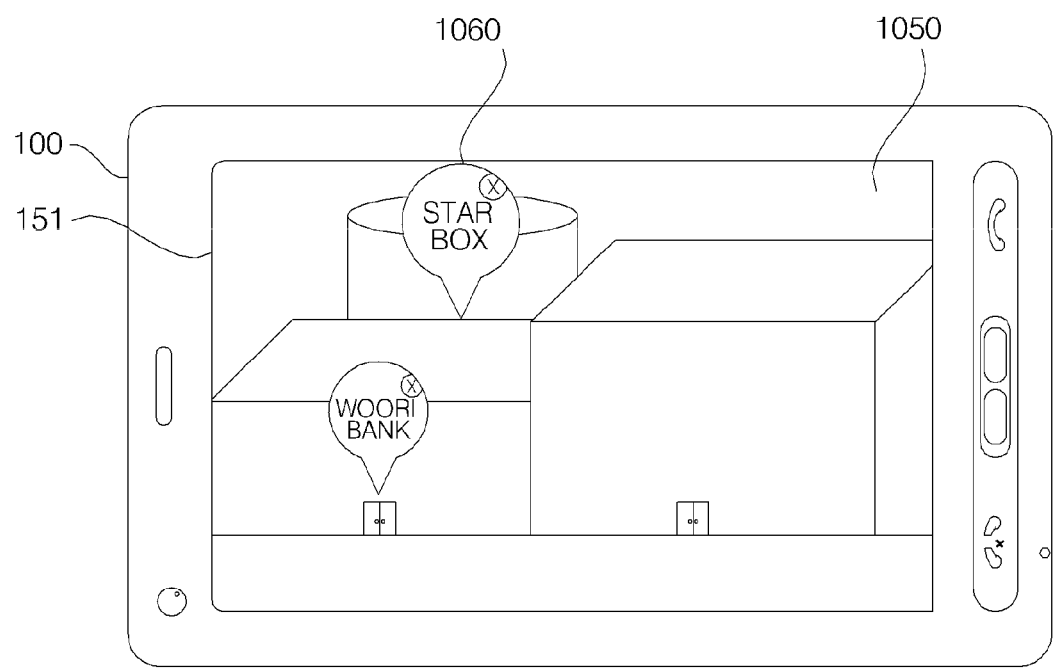

With reference to FIG. 10D, a preview image 1050 including the object 1032 and its surroundings and object information 1060 of the object 1032 can be displayed on the display module 151. For example, the preview image 1050 can be an image generated by the camera module 121.

As shown in FIG. 10D, the controller 180 determines that the user preference level of the object 1032 has been increased and displays the object information of the object 1032, that is, object information 1060 in FIG. 10D, using a display form that is more distinguishable than the default display form used for displaying other object information in the preview image 1050. For example, referring to FIG. 10D, the object information 1060 can be displayed using a larger size than other object information.

Figure 11A:
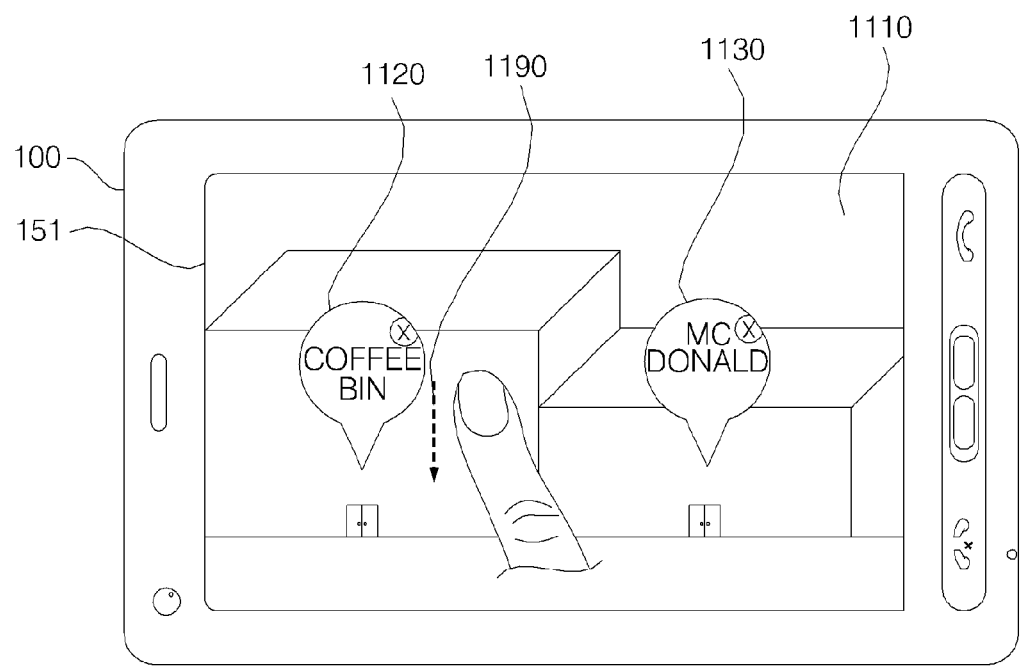
FIGS. 11A through 11C illustrate exemplary screens of a mobile terminal for changing the display state of object information in the AR mode in accordance with various embodiments of the invention.
Figure 11B:
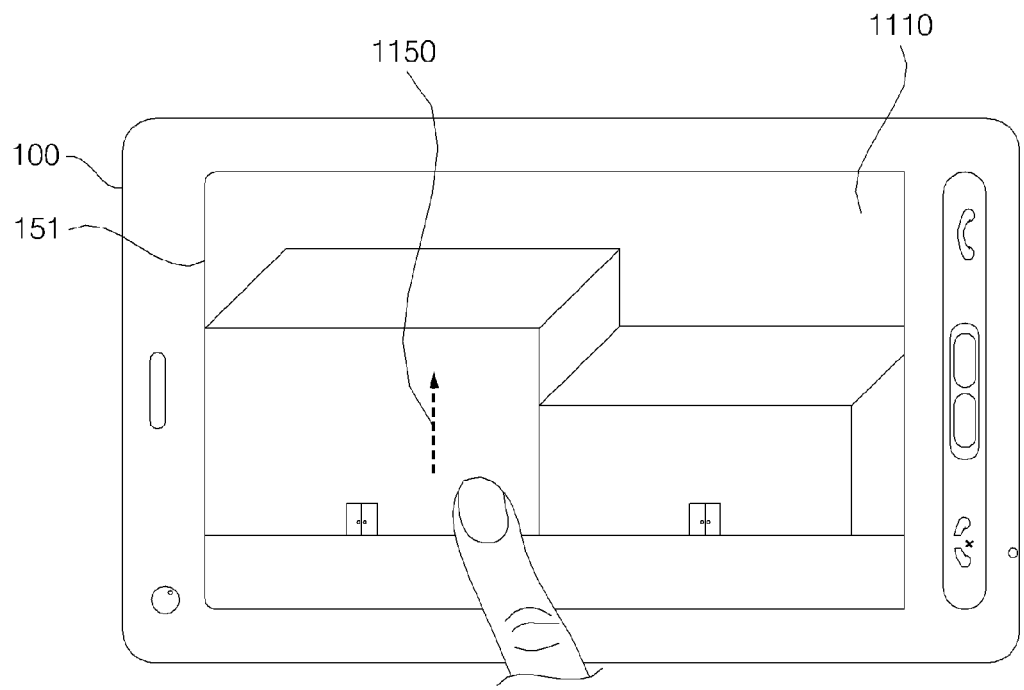
Figure 11C:
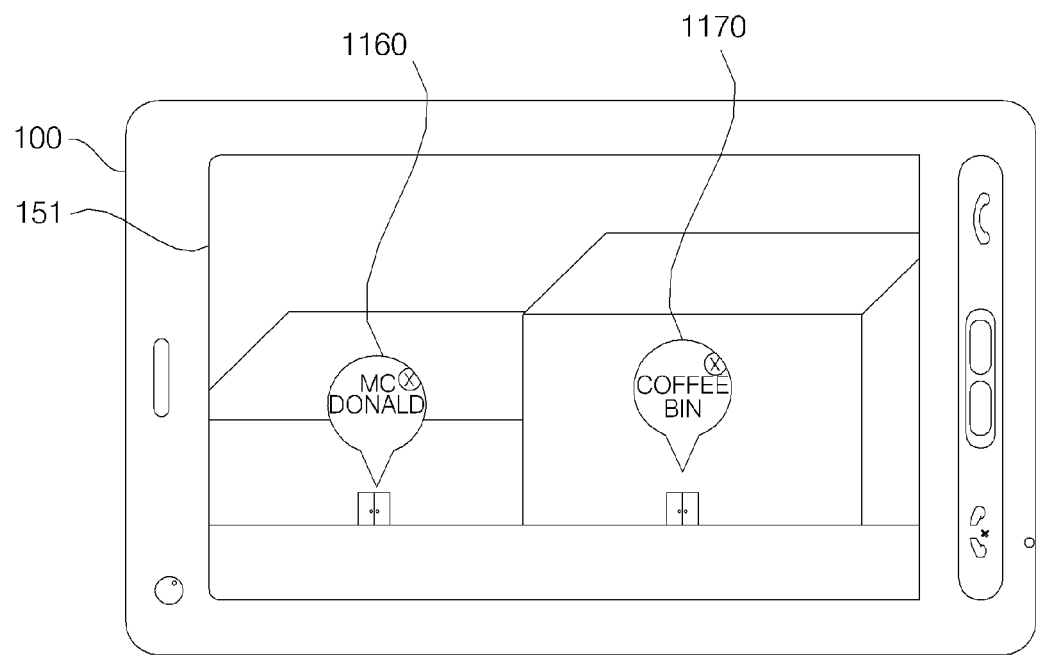

FIGS. 11A through 11C illustrate exemplary screens of a mobile terminal for changing the display state of object information in the AR mode in accordance with various embodiments of the invention.

Referring to FIGS. 11A and 11B, a preview image 1110 including object information 1120 and object information 1130 can be displayed using a default display form on the display module 151 of the mobile terminal 100. For example, the preview image 1110 can be an image generated by the camera module 121. If a user enters a user command 1190 by touching one part of the display module 151 with a pointer, such as the user's finger, and dragging the pointer down across the display module 151, the controller 180 can determine that the user command is for no longer displaying object information on display module 151. As a result, the controller 180 can display the preview image 1110 on the display module 151 without any object information. Then, the controller 180 can reduce the user preference level for each of the object information 1120 and the object information 1130.

Thereafter, as shown in FIG. 11B, if the user enters a user command 1150 by touching one part of the display module 151 with the pointer and dragging the pointer up across the display module 151, the controller 180 can determine that the user command 1150 is for displaying previously-deleted object information. As a result, the controller 180 can display the object information 1120 and the object information 1130 on the display module 151. Since the user preference level for both the object information 1120 and the object information 1130 has been reduced, the controller can display the object information 1120 and the object information 1130 using a display form that is less distinguishable than the default display form. For example, the object information 1120 and the object information 1130 can be displayed using a smaller size, such as the smaller size object information 1160 and the smaller size object information 1170 shown in FIG. 11C.

Figure 12:
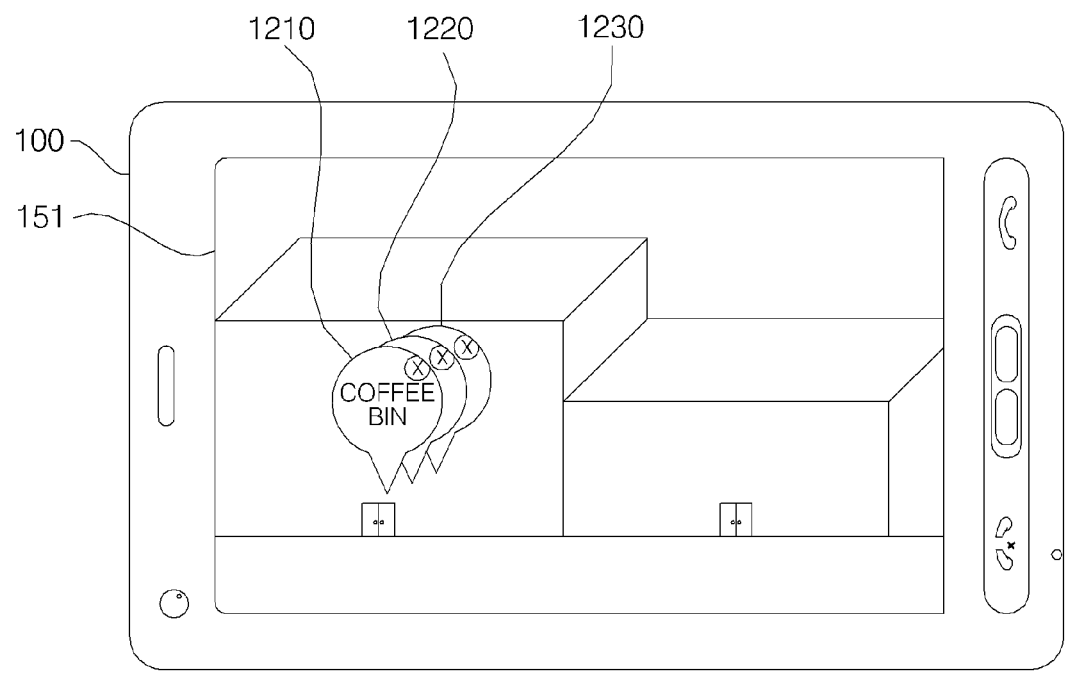
FIG. 12 illustrates an exemplary screen for displaying object information according to the preference of a user in accordance with various embodiments of the invention.

FIG. 12 illustrates an exemplary screen for displaying object information according to the preference of a user. As shown in FIG. 12, a plurality of object information items, such as the first object information 1210, the second object information 1220 and the third object information 1230, can be displayed in an overlapping manner according to the preference of a user. For example, the order of the object information displayed in the overlapping manner can be determined according to the preference of the user.

For example, when the preference levels of the first object information 1210, the second object information 1220 and the third object information 1230 are such that the first object information 1210 has the highest user preference level and the third object information 1230 has the lowest user preference level, the controller 180 can display the third object information 1230 at the bottommost position, with the second object information 1220 over the third object information 1230 and the first object information 1210 over the second object information 1220. As shown in FIG. 12, the second object information 1220 is partially exposed under the first object information 1210, and the third object information 1230 is partially exposed under the first object information 1210 and the second object information 1220.

Since the object information items in FIG. 12 are displayed using a display form according to the preference of a user, the user can immediately identify the most preferred object information, such as the first object information 1210.

Object information can be provided and displayed only for some objects, instead of for all objects available in a preview image, and this will hereinafter be described in further detail with reference to FIG. 13.

Figure 13A:
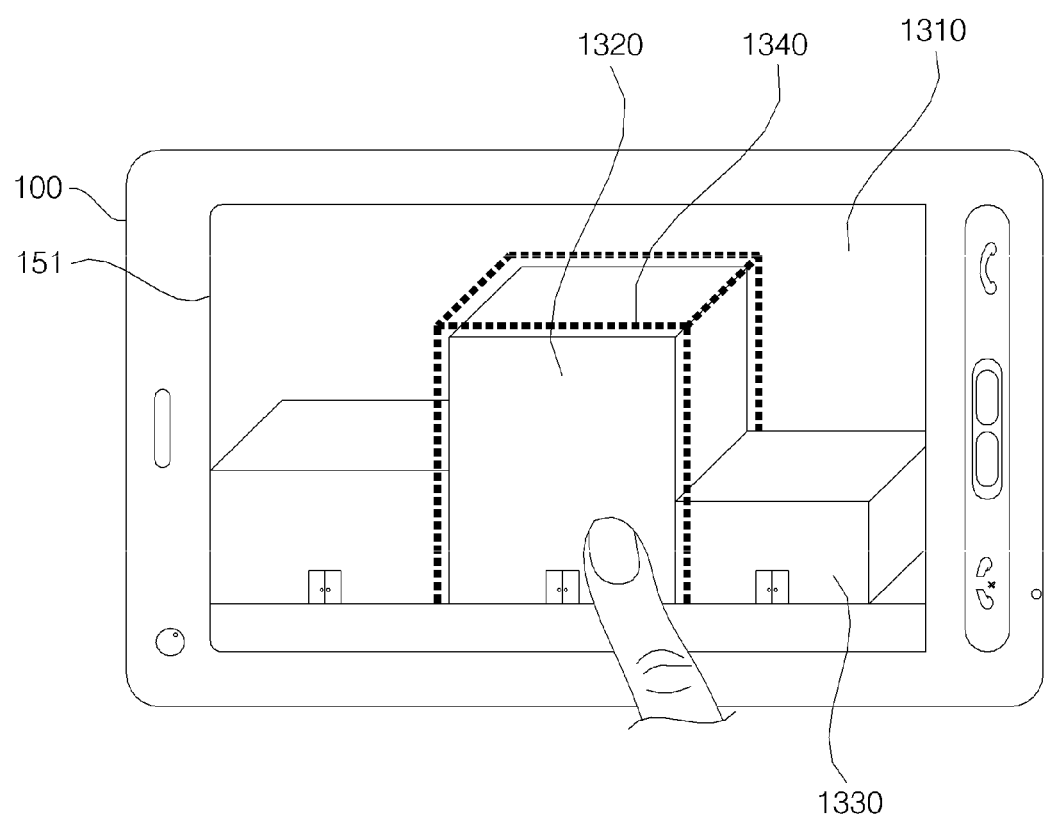
FIGS. 13A and 13B illustrate exemplary screens of a mobile terminal for displaying object information upon the selection of an object in accordance with various embodiments of the invention.
Figure 13B:
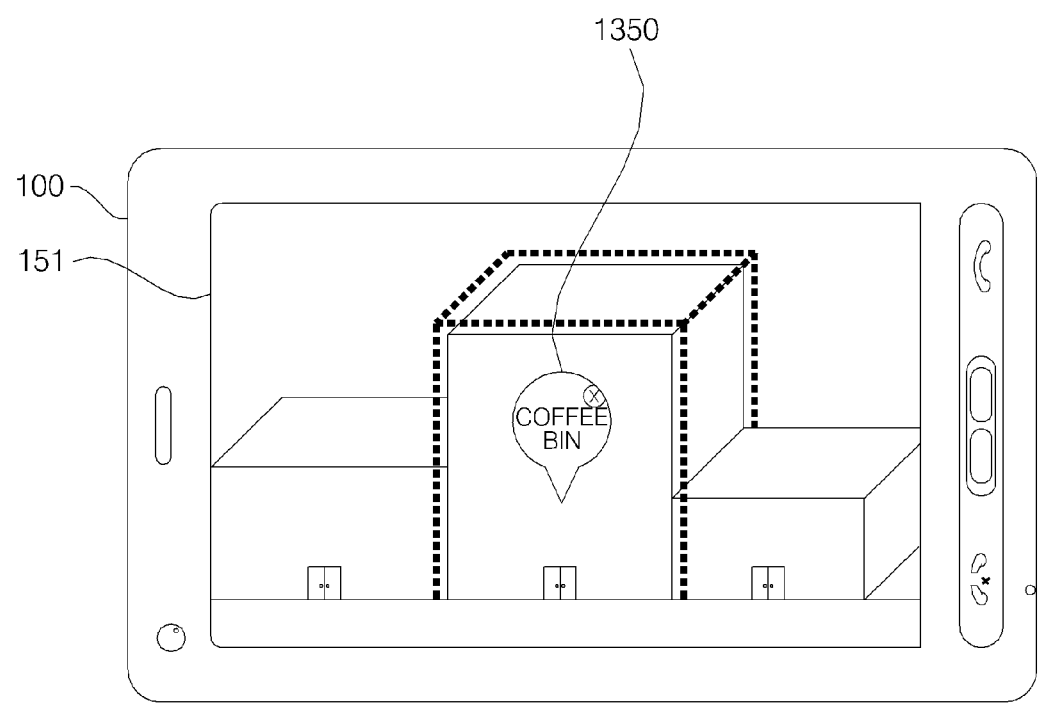

FIGS. 13A and 13B illustrate exemplary screens of a mobile terminal for displaying object information upon the selection of an object in accordance with various embodiments of the invention.

Referring to FIG. 13A, when the mobile terminal 100 is operating in the AR mode, the controller 180 can display a preview image 1310 on the display module 151. For example, the preview image 1310 can be generated by the camera module 121. In the preview image 1310, an object 1320 having corresponding object information 1350 can be displayed using a display form that is different than a display form used for displaying other objects in the preview image 1310, such as the object 1330, that do not have corresponding object information. For example, the object 1320 can be displayed using a dotted outline 1340 to indicate to the user that object information exists for the object 1320. Referring to FIG. 13B, if a user touches the object 1320, the controller 180 can display the object information 1350 on the preview image 1310.

Therefore, in the present embodiment, object information can be displayed only for some objects selected by a user, rather than displaying any available object information for all objects in a preview image. Therefore, the readability of the displayed object information can be improved. Alternatively, the controller 180 can display object information only for objects displayed in a central part of a preview image, regardless of whether the objects are touched or selected by a user.

It should be understood that the mobile terminal 100 and the methods of controlling the mobile terminal 100 according to the exemplary embodiments described herein are not restricted to such exemplary embodiments. Therefore, variations and combinations of the exemplary embodiments described herein can fall within the scope of the invention.

The present invention can be realized as code that can be read by a processor (such as a mobile station modem (MSM)) included in a mobile terminal and that can be written on a computer-readable recording medium. The computer-readable recording medium can be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operation of a mobile terminal, the method comprising:
    displaying, on a display, a preview image generated by a camera, the preview image comprising a plurality of object information items;
    obtaining location information of the mobile terminal;
    obtaining object information for at least one of the plurality of object information items from an object information database stored in a memory of the mobile terminal based on the location information, direction information, and shape recognition of the preview image, wherein the direction information indicates a direction in which the camera is facing;
    displaying the object information using a display form having a default size when no user preference level for the object information is stored in the memory;
    displaying the object information using a display form having a size larger than the default size when a high user preference level for the object information is stored in the memory; and
    displaying the object information using a display form having a size smaller than the default size when a low user preference level for the object information is stored in the memory;
    removing display of the plurality of object information items from the preview image and reducing a user preference level corresponding to each of the removed plurality of object information items in response to a touch input comprising a drag in a downward direction; and
    redisplaying the plurality of object information items on the preview image in response to a touch input comprising a drag in an upward direction, the redisplayed plurality of object information items having a size smaller than the removed plurality of object information items.

2. The method of claim 1, further comprising setting the user preference level of the object information according to whether the object information was previously selected.

3. The method of claim 1, further comprising:
    reducing the user preference level when the object information is no longer displayed on the display in response to a first user command; and
    increasing the user preference level when detailed information related to the object information is displayed on the display in response to a second user command.

4. The method of claim 1, further comprising:
    displaying the plurality of object information items on the display in an overlapping manner according to a user preference level corresponding to each object information item of the plurality of object information items.

5. The method of claim 4, wherein displaying the plurality of object information items in the overlapping manner comprises displaying object information items having a higher user preference level on top of object information items having a lower user preference level such that the object information items having the lower user preference level are partially obscured.

6. The method of claim 1, further comprising:
    displaying related information related to the object information when a user command for displaying the related information is received;
    increasing the user preference level of the object information; and
    storing the increased user preference level of the object information.

7. The method of claim 1, further comprising:
    receiving a first user command for selecting one of the plurality of object information items;
    setting a user preference level of the selected one of the plurality of object information items in response to the first user command; and
    storing the user preference level of the selected one of the plurality of object information items.

8. The method of claim 7, further comprising:
    receiving a second user command for no longer displaying the selected one of the plurality of object information items; and
    reducing the user preference level of the selected one of the plurality of object information items in response to the second user command.

9. The method of claim 7, further comprising:
    receiving a second user command for displaying information related to the selected one of the plurality of object information items; and
    increasing the user preference level of the selected one of the plurality of object information items in response to the second user command.

10. The method of claim 1, further comprising:
displaying a specific object having corresponding object information using a display form that is different than a display form for displaying objects having no corresponding object information; and
displaying object information corresponding to the specific object on the preview image in response to a selection of the specific object.

11. The method of claim 1, further comprising:
changing a size of the display form in response to a first user command to change the size of the display form; and
adjusting the user preference level stored in the memory based on the change of the size of the display form.

12. A mobile terminal comprising:
a camera configured to capture images;
a display configured to display a preview image generated by the camera, the preview image comprising a plurality of object information items; and
a controller configured to:
obtain location information of the mobile terminal;
obtain object information for at least one of the plurality of object information items from an object information database stored in a memory of the mobile terminal based on the location information, direction information, and shape recognition of the preview image, wherein the direction information indicates a direction in which the camera is facing;
cause the display to display the object information using a display form having a default size when no user preference level for the object information is stored in the memory,
cause the display to display the object information using a display form having a size larger than the default size when a high user preference level for the object information is stored in the memory; and
cause the display to display the object information using a display form having a size smaller than the default size when a low user preference level for the object information is stored in the memory;
remove display of the plurality of object information items from the preview image and reducing a user preference level corresponding to each of the removed plurality of object information items in response to a touch input comprising a drag in a downward direction; and
redisplay the plurality of object information items on the preview image in response to a touch input comprising a drag in an upward direction, the redisplayed plurality of object information items having a size smaller than the removed plurality of object information items.

13. The mobile terminal of claim 12, wherein the controller is further configured to set the user preference level of the object information according to whether the object information was previously selected.

14. The mobile terminal of claim 12, wherein the controller is further configured to:
reduce the user preference level when the object information is no longer displayed on the display in response to a first user command; and
increase the user preference level when detailed information related to the object information is displayed on the display in response to a second user command.

15. The mobile terminal of claim 12, wherein the controller is further configured to cause the display to display the plurality of object information items in an overlapping manner according to a user preference level corresponding to each of the plurality of object information items.

16. The mobile terminal of claim 15, wherein the controller is further configured to cause the display to display the plurality of object information items in the overlapping manner by displaying object information items having a higher user preference level on top of object information items having a lower user preference level such that the object information items having the lower user preference level are partially obscured.

17. The mobile terminal of claim 12, wherein the controller is further configured to:
set a user preference level of a selected one of the plurality of object information items in response to a first user command; and
cause the memory to store the user preference level of the selected one of the plurality of object information items.

18. The mobile terminal of claim 17, wherein the controller is further configured to:
cause the display to no longer display the selected one of the plurality of object information items in response to a second user command; and
reduce the user preference level of the selected one of the plurality of object information items in response to the second user command.

19. The mobile terminal of claim 17, wherein the controller is further configured to:
cause the display to display detailed information related to the selected one of the plurality of object information items in response to a second user command; and
increase the user preference level of the selected one of the plurality of object information items in response to the second user command.

20. The mobile terminal of claim 12, wherein the controller is further configured to:
cause the display to display a specific object having corresponding object information using a display form that is different than a display form for displaying objects having no corresponding object information; and
cause the display to display object information corresponding to the specific object on the preview image in response to a selection of the specific object.

21. The mobile terminal of claim 12, wherein the controller is further configured to:
change a size of the display form in response to a first user command to change the size of the display form; and
adjust the user preference level stored in the memory based on the change of the size of the display form.

* * * * *